(12) United States Patent
Zhang et al.

(10) Patent No.: US 12,557,113 B2
(45) Date of Patent: Feb. 17, 2026

(54) METHOD FOR DETERMINING CELL PARAMETERS BY TERMINAL

(71) Applicant: SAMSUNG ELECTRONICS CO., LTD., Suwon-si (KR)

(72) Inventors: Qi Zhang, Beijing (CN); Feifei Sun, Beijing (CN); Haijie Qiu, Beijing (CN); Xutan Zhou, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 18/145,766

(22) Filed: Dec. 22, 2022

(65) Prior Publication Data

US 2023/0199789 A1 Jun. 22, 2023

(30) Foreign Application Priority Data

Dec. 22, 2021 (CN) .......................... 202111583282.9
Jan. 6, 2022 (CN) .......................... 202210011016.7

(Continued)

(51) Int. Cl.
*H04W 72/23* (2023.01)
*H04L 5/00* (2006.01)
*H04W 72/0453* (2023.01)

(52) U.S. Cl.
CPC ........... *H04W 72/23* (2023.01); *H04L 5/0053* (2013.01); *H04W 72/0453* (2013.01)

(58) Field of Classification Search
CPC . H04J 11/0073; H04J 11/0076; H04L 5/0007; H04L 5/0053; H04L 5/0092;

(Continued)

(56) References Cited

U.S. PATENT DOCUMENTS 10,791,550 B2 * 9/2020 Ko .......................... H04W 48/12
10,945,253 B2 * 3/2021 Ko .......................... H04L 5/001

(Continued)

FOREIGN PATENT DOCUMENTS

CN 115244960 A * 10/2022 ............ H04W 16/14
CN 120456301 A * 8/2025

(Continued)

OTHER PUBLICATIONS

Huawei et al., "Discussion on new channel bandwidths for n79", R4-2117884, 3GPP TSG-RAN WG4 Meeting #101-e, Nov. 1-12, 2021, 2 pages.

(Continued)

*Primary Examiner* — Eric Nowlin

(57) ABSTRACT

The disclosure relates to a 5th generation (5G) or 6th generation (6G) communication system for supporting a higher data transmission rate. A method performed by a user equipment (UE) in a wireless communication system is provided. The method may comprises receiving, from a base station, a synchronization signal/physical broadcast channel (SS/PBCH) block on a PBCH, identifying a frequency band on which the SS/PBCH block is received, in case that the frequency band is a first frequency band, determining configuration information for a control resource set (CORESET) for a Type0 physical downlink control channel (PDCCH) search space set based on a minimum channel bandwidth of the first frequency band, and in case that the frequency band is a second frequency band including a n79 frequency band, determining the configuration information for the CORESET corresponding to the n79 frequency band.

14 Claims, 18 Drawing Sheets

(30) Foreign Application Priority Data

Jan. 18, 2022 (CN) .......................... 202210056605.7
Feb. 14, 2022 (CN) .......................... 202210134867.0

(58) Field of Classification Search
CPC .............................. H04L 5/0094; H04W 48/10; H04W 56/0015; H04W 72/0453; H04W 72/0457; H04W 72/23

See application file for complete search history.

(56) References Cited

U.S. PATENT DOCUMENTS

| | | | |
|---|---|---|---|
| 11,160,050 B2 | 10/2021 | Si et al. | |
| 11,388,049 B2 * | 7/2022 | Da | H04W 48/12 |
| 11,711,774 B2 * | 7/2023 | Xu | H04W 56/001 370/329 |
| 12,022,492 B2 * | 6/2024 | Takeda | H04W 74/0891 |
| 2019/0159148 A1 | 5/2019 | Jung et al. | |
| 2019/0200307 A1 | 6/2019 | Si et al. | |
| 2019/0223163 A1 * | 7/2019 | Ko | H04W 72/23 |
| 2019/0289530 A1 * | 9/2019 | Ko | H04L 5/001 |
| 2019/0349059 A1 | 11/2019 | Wilson et al. | |
| 2020/0396122 A1 * | 12/2020 | Da | H04L 7/0008 |
| 2021/0360545 A1 * | 11/2021 | Sköld | H04L 27/261 |
| 2022/0272693 A1 * | 8/2022 | Takahashi | H04W 72/0446 |
| 2022/0295350 A1 * | 9/2022 | Takahashi | H04W 48/12 |
| 2022/0312274 A1 * | 9/2022 | Takahashi | H04L 5/001 |
| 2023/0057016 A1 * | 2/2023 | Alriksson | H04W 16/14 |
| 2023/0071927 A1 * | 3/2023 | Kim | H04W 72/23 |
| 2023/0199789 A1 * | 6/2023 | Zhang | H04W 72/23 370/329 |

FOREIGN PATENT DOCUMENTS

| | | | | |
|---|---|---|---|---|
| KR | 20240121825 A | * | 8/2024 | .......... H04J 11/0076 |
| TW | 202228463 A | * | 7/2022 | ............ H04W 72/23 |
| WO | WO-2019097007 A1 | * | 5/2019 | .......... H04W 53/001 |
| WO | WO-2021148356 A1 | * | 7/2021 | ............ H04W 16/14 |
| WO | WO-2022152962 A1 | * | 7/2022 | ............ H04W 72/23 |
| WO | WO-2023121356 A1 | * | 6/2023 | .......... H04J 11/0076 |
| WO | WO-2025167549 A1 | * | 8/2025 | |

OTHER PUBLICATIONS

Samsung, "Adding new channel bandwidths to n79", R4-2117845, 3GPP TSG-RAN WG4 Meeting #101-e, Nov. 1-12, 2021, 3 pages.

International Search Report and Written Opinion of the International Searching Authority regarding International Application No. PCT/KR2022/021096 dated Mar. 20, 2023, 6 pages.

Supplementary Partial European Search Report dated Mar. 3, 2025, in connection with European Patent Application No. 22911989.6, 18 pages.

Samsung, "Discussion on CORESET#0 impact of CBW narrower than 40MHz of n79," R1-2201973, 3GPP TSG-RAN WG1 Meeting #108-e, Electronic Meeting, Feb. 21-Mar. 3, 2022, 7 pages.

The extended European Search Report dated Jul. 4, 2025, in connection with European Application No. 22911989.6, 17 pages.

Drozdova, V., et al., "SDR Based Evaluation of the Initial Cell Search In 5G NR OpenAirInterface Implementation", XP034059777, 2021 IEEE 15th International Conference of Actual Problems of Electronic Instrument Engineering (APEIE), Nov. 2021, 4 pages.

* cited by examiner

METHOD FOR DETERMINING CELL PARAMETERS BY TERMINAL

CROSS-REFERENCE TO RELATED APPLICATIONS

This application is based on and claims priority under 35 U.S.C. § 119 to Chinese Patent Application No. 202111583282.9 filed Dec. 22, 2021, Chinese Patent Application No. 202210011016.7 filed Jan. 6, 2022, Chinese Patent Application No. 202210056605.7, filed Jan. 18, 2022, and Chinese Patent Application No. 202210134867.0, filed Feb. 14, 2022, in the China National Intellectual Property Office, the disclosures of which are incorporated by reference herein in their entirety.

BACKGROUND

1. Field

The present disclosure relates generally to wireless communication system and, more specifically, the present disclosure relates to a method and apparatus for determining a channel bandwidth, and a method and apparatus for determining a parameter in a signal for signal reception and resource configuration information determination.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

A method performed by a user equipment (UE) in a wireless communication system is provided. The method comprises receiving, from a base station, a synchronization signal/physical broadcast channel (SS/PBCH) block on a PBCH, identifying a frequency band on which the SS/PBCH block is received, in case that the frequency band is a first frequency band, determining configuration information for a control resource set (CORESET) for a Type0 physical downlink control channel (PDCCH) search space set based on a minimum channel bandwidth of the first frequency band, and in case that the frequency band is a second frequency band including a n79 frequency band, determining the configuration information for the CORESET corresponding to the n79 frequency band.

A user equipment (UE) in a wireless communication system is provided. The JE comprises a transceiver and a controller coupled with the transceiver. The controller is configured to receive, from a base station, a synchronization signal/physical broadcast channel (SS/PBCH) block on a PBCH, identify a frequency band on which the SS/PBCH block is received, in case that the frequency band is a first frequency band, determine configuration information for a control resource set (CORESET) for a Type0 physical downlink control channel (PDCCH) search space set based on a minimum channel bandwidth of the first frequency band, and in case that the frequency band is a second frequency band including a n79 frequency band, determine the configuration information for the CORESET corresponding to the n79 frequency band. A method performed by a user equipment (UE) in a wireless communication system is provided. The method comprises receiving, from a base station via a frequency band, a synchronization signal/physical broadcast channel (SS/PBCH) block, in case that the frequency band corresponds to n79 new radio (NR) band supporting a minimum channel bandwidth of 10 MHz, determining configuration information for a control resource set (CORESET) for a Type0—physical downlink control channel (PDCCH) search space set using parameter sets identical to parameter sets for frequency bands with a minimum channel bandwidth of 40 MHz and in case that the frequency band does not correspond to the n79 NR band, determining configuration information for the CORESET for the Type0—PDCCH search space set using parameter sets determined based on a minimum channel bandwidth supported by the frequency band.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
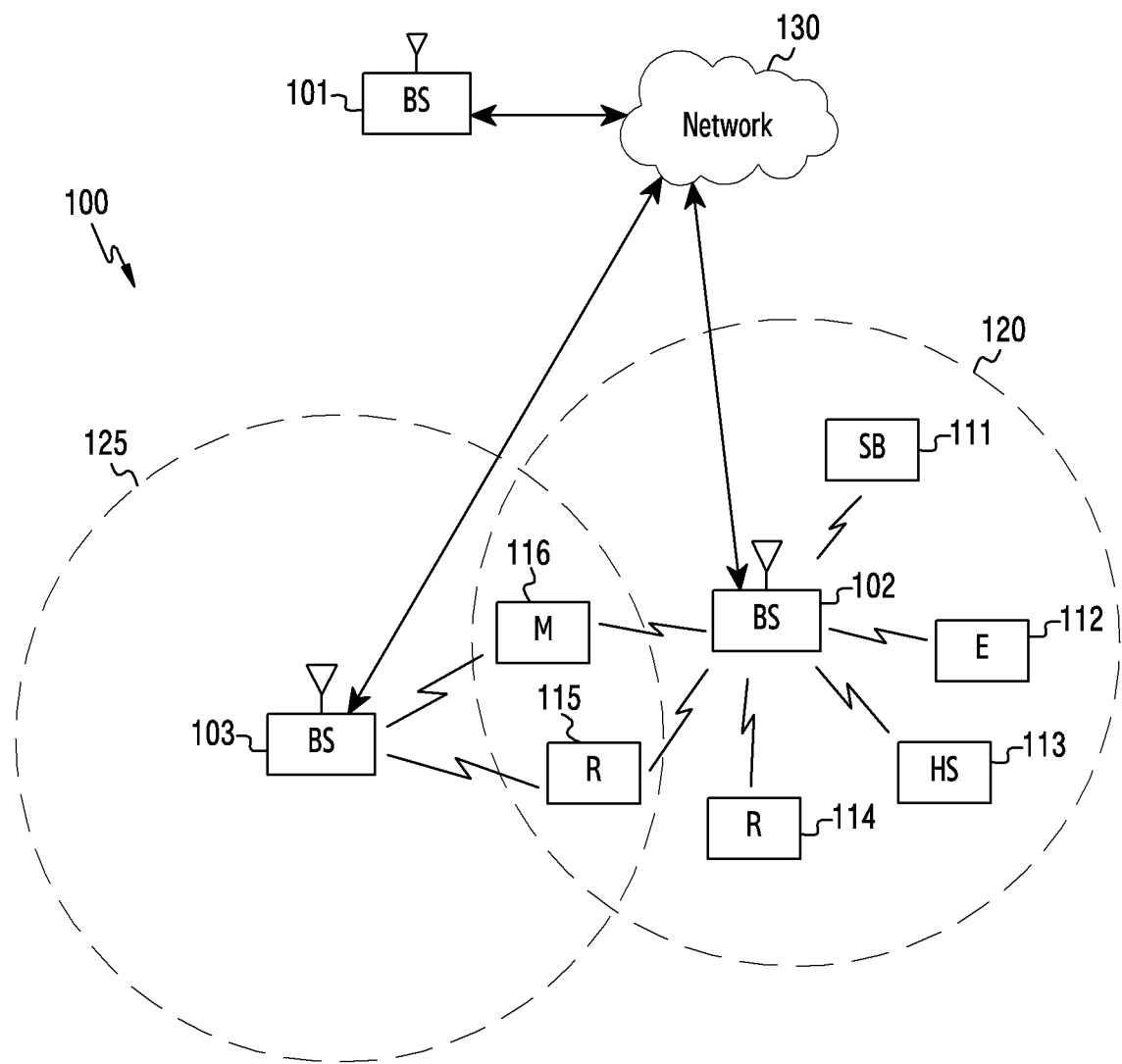
FIG. 1 illustrates an example of a wireless network according to an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

In order to achieve one or more advantages of improving system compatibility, reducing energy consumption by terminals, and reducing terminal performance loss, the methods and apparatuses in the present disclosure are provided.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of user equipments (UEs) within a coverage area 120 of the gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102 and/or 103 can provide access to other or additional external networks, such as external telephone networks or other types of data networks.

Figure 2A:
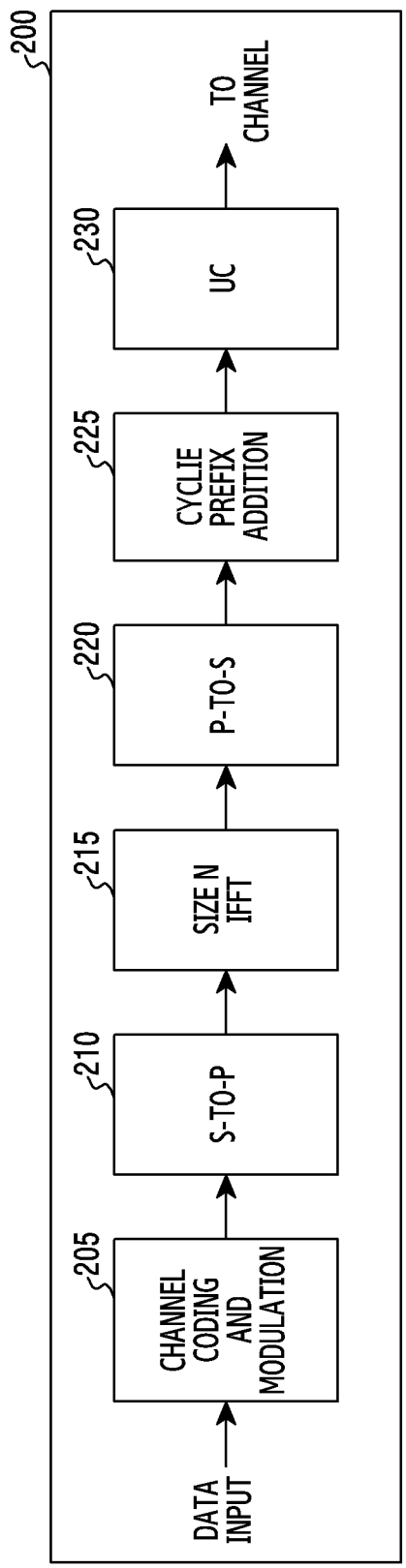
FIG. 2a illustrates an example of transmission and reception paths according to an embodiment of the present disclosure.
Figure 2B:
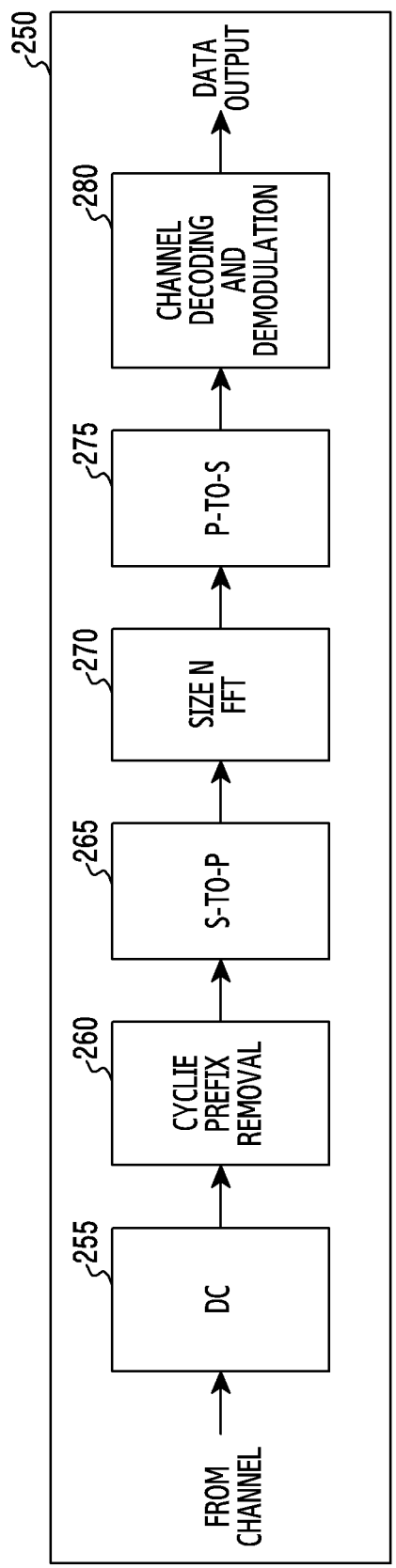
FIG. 2b illustrates an example of transmission and reception paths according to an embodiment of the present disclosure.

FIGS. 2*a* and 2*b* illustrate example wireless transmission and reception paths according to the present disclosure. In the following description, the transmission path 200 can be described as being implemented in a gNB, such as the gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N Fast Fourier Transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in the gNB 102 and the UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2*a* and 2*b* illustrate examples of wireless transmission and reception paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2a and 2b are intended to illustrate examples of types of transmission and reception paths that can be used in a wireless network. Any other suitable architecture can be used to support wireless communication in a wireless network.

Figure 3A:
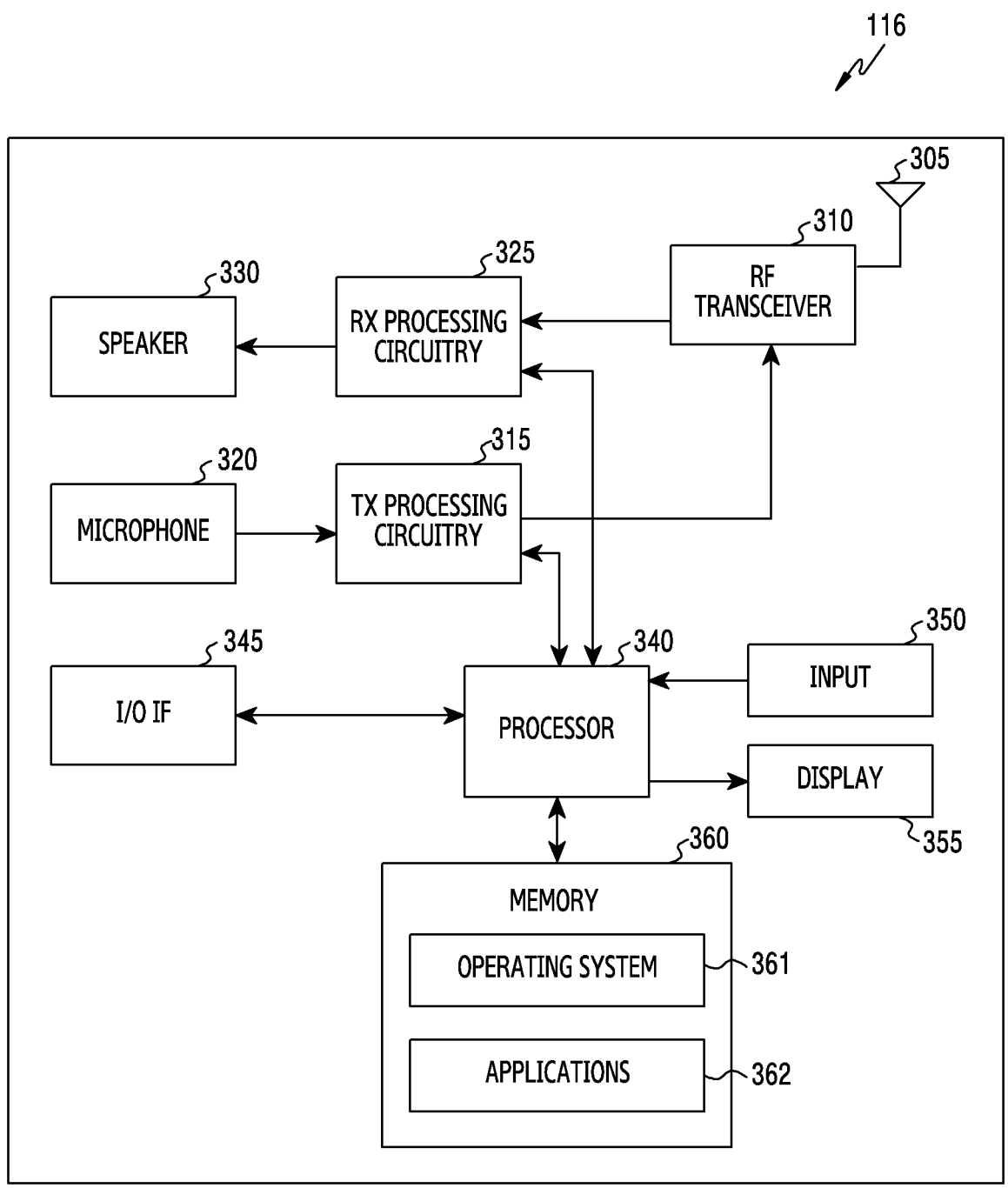
FIG. 3a illustrates an example of a structure diagram of a UE according to an embodiment of the present disclosure.

FIG. 3a illustrates an example of a UE 116 according to an embodiment of the present disclosure.

The embodiment of UE 116 shown in FIG. 3a is for illustration only, and UEs 111-115 of FIG. 1 can have the same or similar configuration. However, a UE has various configurations, and FIG. 3a does not limit the scope of the present disclosure to any specific implementation of the UE.

According to an embodiment, a UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (IO) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides the UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a illustrates an example of UE 116, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 116 is configured as a mobile phone or a smart phone, UEs can be configured to operate as other types of mobile or fixed devices.

Figure 3B:
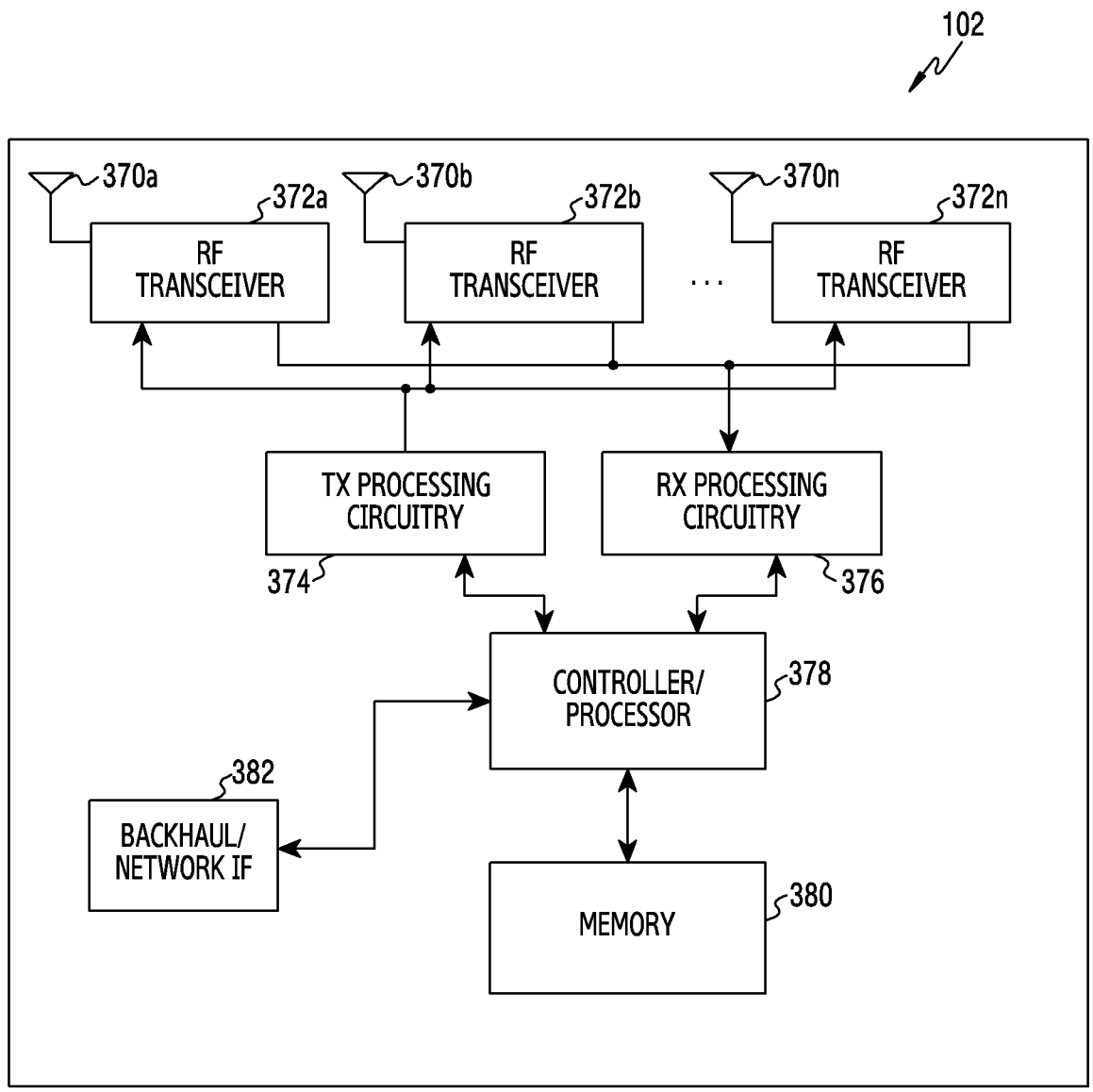
FIG. 3b illustrates an example of a structural diagram of a base station according to an embodiment of the present disclosure.

FIG. 3b illustrates an example of a gNB 102 according to an embodiment of the present disclosure.

The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that the gNB 101 and the gNB 103 can include the same or similar structures as the gNB 102.

Referring to FIG. 3b, the gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, the gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver). Exemplary embodiments of the present disclosure are further described below in conjunction with the accompanying drawings.

The text and figures are provided by way of example only to assist the reader in understanding the present disclosure. They are not intended and should not be construed to limit the scope of the present disclosure in any way. While certain embodiments and examples have been provided, based on the disclosure herein, it will be apparent to those skilled in the art that the illustrated embodiments and examples can be changed without departing from the scope of the present disclosure.

Figure 4:
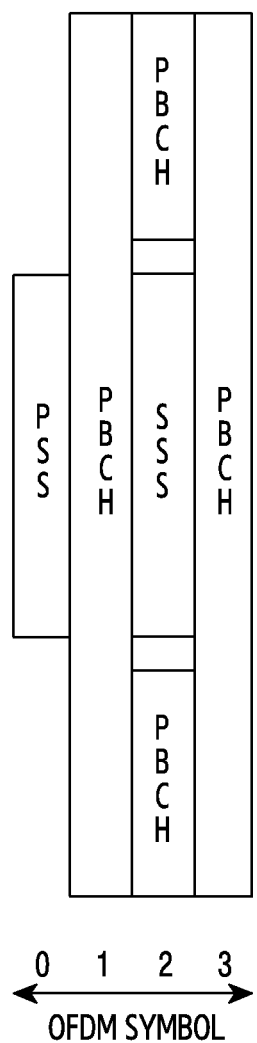
FIG. 4 illustrates an example of a schematic diagram of PSS, SSS and PBCH in the time-frequency domain.

FIG. 4 illustrates a schematic diagram of PSS, SSS, and PBCH in the time-frequency domain.

According to an embodiment, a UE may need or be required to perform downlink synchronization before initial random access to a new radio (NR) system or 5G system, to receive necessary configuration of SIB1 (or configuration of system information), and then the UE may perform the initial random access according to received SIB1 parameters. The NR system may be devised with primary synchronization signal (PSS) and secondary synchronization signal (SSS) for downlink synchronization, and may transmit master information block (MIB) on a broadcast channel (e.g., physical broadcast channel (PBCH)).

The PSS and the SSS may occupy 1 symbol and 127 subcarriers in the time-frequency domain, and PBCH may occupy 3 symbols and 240 subcarriers in the time-frequency domain, as shown in FIG. 4. Synchronization signals PSS, SSS and PBCH channel may together constitute or configure SSB (synchronization signal/PBCH block, SS/PBCH block).

The protocol may specify a global synchronization signal global synchronization channel number (GSCN) supported by the frequency bands, which is used for quick downlink synchronization at the frequency band position. The subcarrier with subcarrier index 120 in the SSB may be aligned with the synchronization raster.

5G (the fifth-generation) has been system-optimized and designed with respect to enhanced Mobile Broadband (eMBB), enhanced ultra-reliable low latency (eURLLC), and enhanced machine type communication (eMTC) and the like.

The protocol may need to support frequency bands with a bandwidth of less than 5 MHz (3 MHz to 5 MHz) for some railway scenarios, such as future railway mobile communication system (FRMCS), PPDU, smart utilities and the like (frequency bands being RMR-900 frequency band, n8, n26, n28). And the minimum channel bandwidth currently supported by these frequency bands may be 5 MHz. Upon introducing the bandwidth of 3 MHz supported by the system, the PBCH channel bandwidth with a subcarrier spacing of 15 KHz may be 3.6 MHz, which exceeds the bandwidth that the base station can support. Additionally, the protocol may support more channel bandwidth values (e.g., 10 MHz, 20 MHz, etc.) for the n79 band. For example, n79 band may be referred to a frequency band from 4.72 to 4.82 GHz. The numerical example of the frequency band of n79 is merely an example and does not limit the disclosure.

At this point, a method for signal reception and/or parameter determination is required, otherwise the following problems will arise:

Terminals or user equipment (UE) that do not support bandwidths less than 5 MHz consuming too much energy during the initial cell selection process.

In an implementation of initial cell selection by a terminal, after detecting the PSS/SSS in a certain synchronization raster, the terminal may sort the received signals, and proceeds to detect the PBCH for the PSS/SSS with the highest signal strength, but because the effective bandwidth of the system of 3 MHz is exceeded when the PBCH is transmitted, the terminal performs detection according to 5 MHz at this point, thereby introducing interference signals within the sideband guard spacing, resulting in the failure of PBCH decoding.

After the failure, the terminal may perform multiple detections of the PBCH, or search for the SSB with sub-optimal channel quality. When many cells with less than 5 MHz bandwidth are deployed, the same steps may occur in each of the synchronization rasters, resulting in terminal energy consumption. And when the quality of the PBCH channel is good, the terminals that support the minimum channel bandwidth of 5 MHz may still can successfully decode the PBCH, and then the terminals perform the detection of CORESET0. Similarly, the minimum bandwidth of CORESET0 is 24 PRB*12*15 KHz=4.32 MHz, and the effective bandwidth of the system is also exceeded when the base station transmits CORSET0, which causes failure of detection of PDCCH corresponding to the SIB1 in CORESET0 and the terminal may attempt to detection for many times, which causes energy consumption of the terminal:

Performance loss in the initial cell selection process for terminals that support bandwidths less than 5 MHz.

For a terminal that supports bandwidths less than 5 MHz, the implementation (or terminal) may detect SSB based on (or using) bandwidths less than 5 MHz, or detect SSB based on (or using) a bandwidth of 5 MHz. When the minimum bandwidth of the system is a of 5 MHz, if the terminal performs SSB detection based on bandwidths less than 5 MHz, the performance may be thus lost since the terminal cannot fully receive the PBCH signal. And when the bandwidth of the system is less than 5 MHz, if the terminal performs SSB detection according to the minimum bandwidth of 5 MHz, the performance may loss due to reception of the reserved band of the SSB sideband for SSB detection by the terminal:

Terminals supporting a new bandwidth being capable of determining the parameter configuration in CORESET0, or the configuration being limited.

In the existing method, a terminal may obtain parameters controlResourceSetZero (control resource set 0) and searchSpaceZero (search space 0) in the MIB through PBCH decoding. And then the terminal may receive SIB1 to initially access to a cell, wherein the terminal may select a table used to indicate the parameter controlResourceSetZero according to the minimum channel bandwidth supported by the downlink frequency band on which the terminal resides, SSB subcarrier spacing and PDCCH subcarrier spacing. And then the terminal may obtain the number of resource blocks (RBs) and the number of the symbols and offset (offset value) value of CORESET0 according to the parameter controlResourceSetZero.

For example, after the above frequency bands are introduced to a system with a bandwidth of less than 3 MHz, the minimum channel bandwidth supported by these frequency bands is no longer 5 MHz, but 3 MHz. When the terminal may identify, check, or look up the table according to the existing method, the matched table cannot be founded and thus parameter configuration information of CORESET0 cannot be determined, so that the terminal cannot access to the cell. As another example, after the introduction of 10 MHz bandwidth in frequency band n79, the minimum channel bandwidth supported by the n79 frequency band is no longer 40 MHz, but 10 MHz. At this point, a terminal supporting the new bandwidth may identify, check or look up a table corresponding to 10 MHz, while the existing terminals in the network t may still identify, check or look up to the table corresponding to 40 MHz. And in order to ensure the backward compatibility upon introducing new bandwidths, the base station may only configure the same number of CORESET0 configuration in the two tables, which limits the flexibility of the base station configuration.

Therefore, it is necessary to provides an enhanced method to ensure the performance of the terminal for initial cell selection and access.

Figure 5:
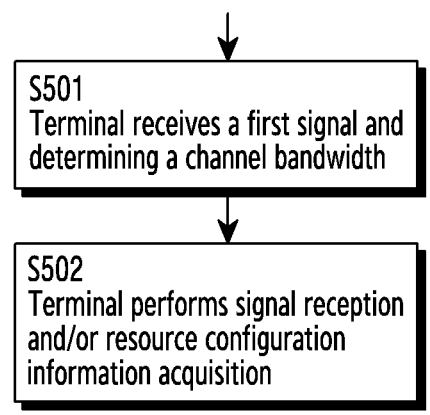
FIG. 5 illustrates an example of a method according to an embodiment of the present disclosure.

FIG. 5 illustrates an example method according to an embodiment of the present disclosure An embodiment of the present application provides a method for signal reception and parameter determination, as shown in FIG. 5.

Referring to FIG. 5, in step S501, a terminal may determine a channel bandwidth according to (or based on) downlink frequency band information, the capability of the terminal and the received first signal. The first signal may be at least one of PSS/SSS, the master information block transmitted on the PBCH, other payloads other than the master information block transmitted on the PBCH, and SIB. In an embodiment, when the frequency band is the RMR-900 frequency band, n8, n26 or n28, the channel bandwidth is less than 5 MHz and/or when the frequency band is n79 or on the newly defined frequency band (or, specific band) nX, the channel bandwidth is at least one of 10 MHz or 20 MHz. The newly defined frequency bands (specific bands or predetermined bands) nX have overlap with n79. For example, the newly defined frequency bands may at least partially overlap with n79. Depending on the implementation of the first signal, the determination of the channel bandwidth based on (or, using) the first signal may be implemented by one or more of the following methods.

Although the step 501 is illustrated in FIG. 5 of the disclosure, the step 501 may be omitted. For example, the step 502 is performed without performing the step 501.

In one embodiment, when the first signal is PSS/SSS, the channel bandwidth is determined based on (or, using) the value ranges of the parameters in the PSS/SSS sequence. The value range is related to the capability of the terminal. In an embodiment, the base station may determine the generation parameters of the PSS/SSS sequence according to (or, using) the channel bandwidth. At this point, the terminal may determine the value ranges of the parameters in the PSS/SSS sequence according to the capabilities, and may perform related calculations on the synchronization sequence according to (or based on) the value ranges.

According to an embodiment, when the terminal receives a synchronization signal on a specific frequency band, the terminal may first determine whether capabilities of the terminal support the specific channel bandwidth on the specific frequency band.

when the terminal supports the specific channel bandwidth on the specific frequency band, the related calculations may be performed on the synchronization sequence within the extended value ranges of the PSS/SSS synchronization sequence parameters to detect the synchronization sequence, and modulo the extended PSS/SSS synchronization sequence parameter values when calculating the cell number to ensure that the cell number is within the original value range.

When the capability of the terminal do not support the specific channel bandwidth on the specific frequency band, the synchronization sequence related calculations are performed according to (based on) the existing parameter values, to detect the synchronization sequence. This method may enable the terminals that do not support the specific channel bandwidth on the specific frequency band to no longer receive subsequent signals after the synchronization signal, while for the terminals that support the specific channel bandwidth on the specific frequency band, they may further receive subsequent signals after the synchronization signal, so as to access to the cell, ensuring the backward compatibility of the specific channel bandwidth on the specific frequency band to the terminal.

The PSS sequence is an M sequence with a length of 127. Below are 3 PSS sequences, where the values of $N_{ID}^{(2)}$ are 0, 1, and 2:

$$d_{PSS}(n) = 1 - 2x(m)$$

$$m = (n + 43 N_{ID}^{(2)}) \bmod 127$$

$$0 \le n < 127$$

In a detection of PSS sequence, the terminal performs autocorrelation processing on the sequence to obtain the sequence transmitted by the base station.

The SSS sequence is a gold sequence with a length of 127. Below are 1008 SSS sequences, where the values of $N_{ID}^{(1)}$ are 0, 1, ..., 335.

$$d_{SSS}(n) = [1 - 2x_0((n + m_0) \bmod 127)][1 - 2x_1((n + m_1) \bmod 127)]$$

$$m_0 = 15 \left\lfloor \frac{N_{ID}^{(1)}}{112} \right\rfloor + 5 N_{ID}^{(2)}$$

$$m_1 = N_{ID}^{(1)} \bmod 112$$

$$0 \le n < 127$$

The terminal obtains $N_{ID}^{(2)}$ after detecting the PSS, and then detects the SSS to obtain $N_{ID}^{(1)}$, so as to obtain the cell number $N_{ID}^{cell} = 3 N_{ID}^{(1)} + N_{ID}^{(2)}$.

For a system with a specific channel bandwidth on a specific frequency band, the values of $N_{ID}^{(1)}$ and/or $N_{ID}^{(2)}$ may be extended to generate more PSS and/or SSS sequences.

In an embodiment, a terminal supporting a specific channel bandwidth on a specific frequency band may perform synchronization signal reception in frequency bands that are RMR-900 frequency band, n8, n26, and n28, the values of $N_{ID}^{(2)}$ are 0, 1, 2, 3, 4, and 5, and the values of $N_{ID}^{(2)}$ 0, 1, ..., 335. When calculating the cell number, $N_{ID}^{(2)'} = N_{ID}^{(2)} \bmod 3$, and the cell number is $N_{ID}^{cell} = 3 N_{ID}^{(1)} + N_{ID}^{(2)'}$.

For a terminal that does not support a specific channel bandwidth on a specific frequency band, the autocorrelation is performed according to the original value of $N_{ID}^{(2)}$, and a sequence is no longer detected, thereby avoiding subsequent access processed. In an embodiment, the values of $N_{ID}^{(2)}$ are 0, 1, 2, and the values of $N_{ID}^{(1)}$ are 0, 1, ..., 335, ..., 669. When calculating the cell number, $N_{ID}^{(1)'} = N_{ID}^{(1)} \bmod 336$, and the cell number is $N_{ID}^{cell} = 3 N_{ID}^{(1)'} + N_{ID}^{(2)}$. In this method, only the synchronization sequence is changed, but the original cell number may be maintained, which facilitates compatibility with related sequences initialized by using the cell number, such as DMRS sequence and the like.

In one embodiment, the first signal used to determine the channel bandwidth is a parameter transmitted in the PBCH. The parameter may be the Kssb in the master information block in the PBCH or reserved bit(s) in payloads other than the master information block in the PBCH, where the parameter Kssb is the subcarrier spacing from subcarrier 0 of the common RB $N_{CRB}^{SSB}$ to subcarrier 0 in the SSB.

According to an embodiment, the channel bandwidth may be determined based on (or using) the parameter Kssb in the master information block (MIB) transmitted in PBCH, and/or the channel bandwidth is determined based on (or using) the reserved bit(s) in payload(s) other than the master information block transmitted in PBCH.

In an embodiment, the base station may determine at least one of the parameter Kssb in the master information block transmitted in PBCH or the reserved bit(s) in payload(s) other than the master information block transmitted in PBCH according to the channel bandwidth. And the base station may send, transmit or delivery downlink signals to the terminal according to (or, based on) the determined parameters.

When the terminal performs PBCH reception on a specific frequency band, the terminal may first determine whether capabilities of the terminal support the specific channel bandwidth on the specific frequency band and/or whether it is a terminal with special capabilities. When the terminal supports the specific channel bandwidth on the specific frequency band, the terminal may determine the channel bandwidth according to (or, based on) the parameter values transmitted in the PBCH and may perform subsequent signal reception to access to the cell. When the terminal does not support a specific channel bandwidth on a specific frequency band, the terminal does not perform determination of the channel bandwidth.

After the terminal detects the PBCH in the SSB, the channel bandwidth is determined according to the parameters in the PBCH, and then the subsequent signals are received, which may prohibit a terminal that does not support the specific channel bandwidth on the specific frequency band from further receiving subsequent signals, thereby facilitating energy conservation of the terminal during the cell selection process. And for a terminal that supports a specific channel bandwidth on a specific frequency band, after determining the channel bandwidth, the terminal may perform subsequent signal reception according to the specific channel bandwidth (e.g., determine the position of CORESET0 and blindly detect SIB1 of the PDCCH), which facilitates improving the performance of subsequent received signals, and increase the access success rate of the terminal in the specific channel bandwidth on the specific frequency band.

In one example, the terminal determines the channel bandwidth according to the value of the parameter Kssb in the master information block. When the terminal performs PBCH reception on a specific frequency band, the terminal may first determine whether capabilities of the terminal support the specific channel bandwidth on the specific frequency band and/or whether it is a terminal with special capabilities. When the terminal supports a specific channel bandwidth on the specific frequency band, the terminal may determine the channel bandwidth according to (based on) the Kssb and may perform subsequent signal reception to access to the cell. In an embodiment, when the system subcarrier spacing is a specific value and the value of Kssb falls within a predetermined range, the terminal may determine the channel bandwidth to be a specific value. In an embodiment, when the value of Kssb is a predetermined value, the terminal may determine the channel bandwidth to be a specific value. When the terminal does not support the specific channel bandwidth on the specific frequency band, the terminal does not perform determination of the channel bandwidth.

The payload of the PBCH signal may contain, include or comprise configuration information of the system, where the parameter Kssb is the subcarrier spacing from subcarrier 0 of the common $RBN_{CRB}^{SSB}$ to subcarrier 0 in the SSB. And the common $RBN_{CRB}^{SSB}$ is obtained from the higher layer parameter offsetToPointA in the PBCH payload.

For non-shared spectrum channel access, the least significant bits (LSB) 4 bits of Kssb are configured by the high layer parameter ssb-SubcarrierOffset in the PBCH payload, and the most significant bits (MSB) are transmitted in the PBCH payload $\bar{a}_{\bar{A}+5}$. When the frequency range is FR1, if the value of Kssb is greater than 23, the CORESET of Type0-PDCCH CSS is not configured in the SSB received by the terminal. At this point, if the Kssb value transmitted in the first SSB is greater than or equal to 24 and less than or equal to 29, the terminal may determine the GSCN position of the nearest second SSB according to other configurations. And if the Kssb value is equal to 31, the terminal may determine, based on other configurations, that the CORESET of Type0-PDCCH CSS is not configured for any SSB in a frequency domain range.

In an embodiment, for a terminal whose minimum supported channel bandwidth is less than 5 MHz, if the Kssb received in a specific FR1 frequency band (RMR-900 frequency band, n8, n26, n28) is greater than or equal to 24, the channel channel bandwidth corresponding to the SSB detected by the terminal is less than 5 MHz (e.g., 3 MHz). For a terminal that does not support the minimum channel bandwidth of less than 5 MHz, the parameter Kssb is interpreted according to the existing method, that is, it is considered that the CORESET of Type0-PDCCH common search space (CSS) is not configured in the SSB. At this point, the terminal may no longer proceed with detection of subsequent signals (e.g., PDCCH, PDSCH) for initial cell access. This method has limited impact on existing protocols, and meanwhile solves the problem of backward compatibility of the terminal upon introducing a system with a minimum channel bandwidth of less than 5 MHz.

For SSB typeA, $\mu \in \{0, 1\}$, $k_{SSB} \in \{0, 1, 2, \ldots, 23\}$, $k_{SSB}$ and $N_{CRB}^{SSB}$ being defined with subcarrier spacing of 15 KHz. When $\mu=0$, the value of Kssb ranges from 0 to 11. At this point, the value range of Kssb from 12 to 23 may be used to determine the channel bandwidth. In an embodiment, for a terminal that supports a minimum channel bandwidth of less than 5 MHz, when the subcarrier spacing indicated by the parameter subcarrierSpacingCommon received in a specific FR1 frequency band (e.g., RMR-900 frequency band, n8, n26, n28) by the detected SSB (type A) by is 15 KHz, and the value of the parameter Kssb in the SSB ranges from 12 to 23, then the channel channel bandwidth corresponding to the SSB is less than 5 MHz (e.g., 3 MHz). For a terminal that does not support a minimum channel bandwidth of less than 5 MHz, when the subcarrier spacing indicated by the parameter subcarrierSpacingCommon in the received SSB is 15 KHz, and the value of the parameter Kssb in the SSB ranges from 12 to 23, then the terminal re-performs detection of cell selection according to the existing method. This method also has limited impact on existing protocols, and can also solve the problem of backward compatibility of the terminal upon introducing a system with a minimum channel bandwidth of less than 5 MHz. In addition, this method may also support configuration of NCD-SSB in the specific frequency band, that is, CORESET of Type0-PDCCH CSS is not configured in SSB.

In one example, a parameter is added in the PBCH payload to indicate the bandwidth of a specific cell. When a terminal performs PBCH reception on a specific frequency band, the terminal may first determine whether capabilities of the terminal support a specific channel bandwidth on a specific frequency band and/or whether it is a terminal with special capabilities. When the terminal supports the specific channel bandwidth on the specific frequency, the terminal may determine the channel bandwidth according to the reserved bits and perform subsequent signal reception to access to the cell. When the reserved bits are of (or include) a predetermined value, the channel bandwidth is determined to be a specific value. When the terminal does not support a specific channel bandwidth on a specific frequency band, the terminal does not perform determination of the channel bandwidth.

In the payload of the existing PBCH, when $\bar{L}_{max}$ is not equal to 10, 20, or 64, the bit $\bar{a}_{\bar{A}+6}$, $\bar{a}_{\bar{A}+7}$ are reserved bits. The reserved bits may be used to determine the channel bandwidth. In an embodiment, for a terminal that supports a minimum channel bandwidth of less than 5 MHz, the terminal determines whether the cell corresponding to the SSB is a cell with a channel bandwidth of less than 5 MHz according to PBCH payload bits $\bar{a}_{\bar{A}+6}$ and/or $\bar{a}_{\bar{A}+7}$ in the SSB received in a specific FR1 frequency band (e.g., RMR-900 band, n8, n26, n28). For example, when $\bar{a}_{\bar{A}+6}=1$, it is indicated that the cell is a cell with a channel bandwidth of less than 5 MHz (e.g., 3 MHz), and when $\bar{a}_{\bar{A}+6}=0$, it is indicated that the cell is a cell with a channel bandwidth greater than or equal to 5 MHz. If 2 bits is resulted from combining $\bar{a}_{\bar{A}+6}$ with $\bar{a}_{\bar{A}+7}$, 4 bandwidth scenarios may be indicated. For a terminal that does not support the minimum channel bandwidth of less than 5 MHz, the terminal does not process the bits according to the existing method. The method ensures the initial cell selection performance of a terminal with a minimum channel bandwidth of less than 5 MHz, and can improve the access success rate of a cell with a bandwidth of less than 5 MHz.

In one embodiment, a terminal indicates a specific channel bandwidth according to parameters in a system information block (SIB). After receiving the SIB1, the terminal determines the channel bandwidth to be a specific value according to the parameters in the SIB1, and then performs subsequent signal reception. In an embodiment, the terminal determines whether the channel bandwidth is a specific value according to the parameter carrierBandwidth indication in the SIB1 message, for example, determines that the channel bandwidth is less than 5 MHz. When the number of RBs configured by this parameter is the maximum number of RBs that can be configured in a system with a bandwidth of less than 5 MHz as specified in the protocols, the system has a specific channel bandwidth.

After the terminal determines the channel bandwidth, the terminal performs signal reception according to the determination result. In an embodiment, after determining the channel bandwidth according to the PSS/SSS sequence, the terminal receives the PBCH according to the predetermined frequency domain bandwidth. The predetermined frequency domain bandwidth is determined by the corresponding channel bandwidth. In an embodiment, after determining the channel bandwidth according to the PBCH, the terminal determines CORESET0 according to the predetermined frequency domain bandwidth, and then performs reception of the PDCCH for the SIB1. For example, in the event where the channel bandwidth is 3 MHz, the terminal receives the PBCH according to the 3 MHz bandwidth, and no longer receives signals outside the bandwidth.

The terminal determines parameters transmitted on the second signal according to the channel bandwidth and/or downlink frequency band information and/or capability of the terminal, and these parameters may be used for receiving system information block (SIB) and/or determining the start point of carrier frequency domain resources.

When searching for a cell, the terminal may obtain control resource set 0 (controlResourceSetZero, CORESET0 for short) and search space 0 (searchSpaceZero) in the MIB through PBCH decoding, and then performs reception of SIB1 to initially access to the cell, wherein the terminal selects a table for indicating the parameter controlResourceSetZero according to the minimum channel bandwidth supported by the frequency band on which the terminal resides, the SSB subcarrier spacing and the PDCCH subcarrier spacing, and then obtains the number of RBs, the number of symbols and the offset value of CORESET0 according to the parameter controlResourceSetZero. The minimum channel bandwidth supported by some existing frequency bands is 5 MHz. After introducing a system with a channel bandwidth of less than 5 MHz in these frequency bands, the terminal may determine a table for the parameter controlResourceSetZero according to the downlink frequency band information and/or system bandwidth and/or capability of the terminal, to determine related configuration information of CORESET0, so as to perform reception of the PDCCH for the SIB.

In step S502, the terminal performs signal reception and/or resource configuration information acquisition, where the performance of the configuration information acquisition comprises acquiring the configuration information or configuration parameters transmitted in the second signal, and these parameters may be used for determining the start point of the carrier frequency domain resources. In various embodiments, the second signal may be at least one of: the master information block transmitted in the PBCH, payloads other than the master information block transmitted in the PBCH, and information in SIB. In the case where S501 exists, the terminal may perform signal reception and/or resource configuration information acquisition according to the channel bandwidth determination result (for a specific embodiment, refer to the following embodiments and/or examples). In the case where S501 exists or not, the terminal may perform signal reception and/or obtain resource configuration information according to one or both of the following: the minimum channel bandwidth supported by the downlink frequency band on which the terminal resides, the SSB subcarrier spacing, and the physical downlink Link control channel PDCCH subcarrier spacing (for a specific embodiment, refer to the following embodiments and/or examples); and downlink frequency band information (for a specific embodiment, refer to the following embodiments and/or examples). The above described embodiments may be combined.

The specific implementations in which the terminal performs signal reception and/or resource configuration information acquisition in step S502 are described in more detail below.

In one embodiment, the terminal may perform signal reception and/or resource configuration information acquisition according to the specified minimum channel bandwidth of the downlink frequency band, the SSB subcarrier spacing, and the PDCCH subcarrier spacing. For example, in case that a frequency band on which a master information block (MIB) is received is a first frequency, the terminal may determine configuration information for a coreset (or control resource set) for a physical downlink control channel (PDCCH) based on a minimum channel bandwidth of the first frequency band and the at least one SCS In an embodiment, the terminal may determine the configuration information of CORESET0 in the PBCH to receive the PDCCH for the SIB1. For example, the terminal may receive, from a base station, a master information block (MIB) on a physical broadcast channel (PBCH). The MIB may include information on at least one sub-carrier spacing (SCS)

The terminal may identify, check or look up the existing table or a newly added predefined table (or, specific table) according to (based on) the specified minimum channel bandwidth of the downlink frequency band, the SSB subcarrier spacing and the PDCCH subcarrier spacing to determine the CORESET0 configuration information. And then the terminal may perform reception of the PDCCH for the SIB, wherein the specified minimum channel bandwidth of the downlink frequency band may be different from the minimum channel bandwidth actually supported by the frequency band, and this specified value is simply used for determination of parameter configuration information, wherein only certain numbers are defined in the existing table as available, wherein the number of RBs in the newly added predefined table may be a multiple of 6, and the frequency band occupied by the RBs may be smaller than the effective bandwidth of the system.

This method has limited impact on the current protocol, and does not require the terminal to determine the current channel bandwidth, thereby reducing the complexity of the terminal implementation. In an embodiment, after a minimum channel bandwidth of less than 40 MHz, for example, 10 MHz, 20 MHz, is introduced into the protocol frequency band n79, the protocol may specify that the minimum channel bandwidth used for identifying, checking, or looking up the table for the frequency band n79 is 40 MHz, and the terminal still looks up the table used by the CORESET0 configuration parameters according to the minimum channel bandwidth of 40 MHz.

In an embodiment, this method differs from the existing method in that the minimum channel bandwidth currently supported by certain frequency bands is 5 MHz; and after a minimum channel bandwidth of less than 5 MHz is introduced into these frequency bands, the protocol may specify that the minimum channel bandwidth used for identifying checking or looking up the table of these frequency bands is 5 MHz, and the terminal may still identify, check or look up the table used by the CORESET0 configuration parameters according to (or, based on) the minimum channel bandwidth of 5 MHz. A terminal that performs cell selection on these frequency bands and supports a specific channel bandwidth on a specific frequency band may multiplex a table with a minimum channel bandwidth of 5 MHz (as shown in Table 1 below).

Table 1 illustrates Set of resource blocks and slot symbols of CORESET for Type0-PDCCH search space set when {SS/PBCH block, PDCCH} SCS is {15, 15} kHz for frequency bands with minimum channel bandwidth below 5 MHz (e.g., 3 MHz) or 5 MHz or 10 MHz

TABLE 1

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |

TABLE 1-continued

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | reserved | Reserved | reserved | reserved |

In an embodiment, a system with a specific channel bandwidth on a specific frequency band is a cell residing on (or, supporting) the frequency band n79 or the newly defined frequency band nX with a channel bandwidth of 10 MHz, 20 MHz. The newly defined frequency band and the n79 frequency band overlap. The minimum channel bandwidth supported by the existing n79 is 40 MHz. After 10 MHz and/or 20 MHz channel bandwidth is introduced into this frequency band, the minimum channel bandwidth supported by the n79 is 10 MHz or 20 MHz, as shown in Table 2.

TABLE 2

Channel bandwidths of NR bands
NR BAND/SCS/UE CHANNEL BANDWIDTH

| NR BAND | SCS kHz | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|---|
| n79 | 15 | | | | | | | YES | YES | | | | | |
| | 30 | | YES | | YES | | | YES | YES | YES | | YES | | YES |
| | 60 | | | | | | | YES | YES | YES | | YES | | YES |

When the downlink frequency band on which the terminal resides or uses is n79, and the terminal supports a specific channel bandwidth on a specific frequency band, the terminal may determine the CORESET0 configuration information by identifying, checking or looking up the table according to the minimum bandwidth of 10 MHz, the SSB subcarrier spacing of 30 KHz, and the PDCCH subcarrier spacing of 30 KHz, wherein number 0s in the looked-up table represents valid configuration.

When the downlink frequency band on which the terminal resides is n79, and the terminal does not support a specific channel bandwidth on a specific frequency band, the terminal may determine the CORESET0 configuration information by identifying, checking or looking up the table according to the minimum bandwidth of 40 MHz, the SSB subcarrier spacing of 30 KHz, and the PDCCH subcarrier spacing of 30 KHz, wherein number 0s in the looked-up table represents valid configuration. By restricting the valid configuration numbers, it is ensured that the system supports the above two types of terminals at the same time.

When the terminal cannot determine the CORESET0 configuration table due to overlapping frequency bands, the terminal may traverse multiple CORESET0 tables corresponding to multiple frequency bands to receive the PDCCH for the SIB1. This method is simpler and has less impact on existing protocols, and does not require additional signaling.

In an embodiment, when a cell with a minimum channel bandwidth of 10 MHz, 20 MHz is defined in the frequency band nX overlapping with n79, the terminal is on the overlapped downlink frequency band of n79 and nX, and it cannot be determined the frequency band on which the terminal resides is n79 or nX. At this point, the terminal first determines whether the minimum channel bandwidth defined by the nX frequency band is supported. If so, the terminal may look up the tables respectively according to the minimum channel bandwidth values corresponding to n79 and nX, and perform control channel detection for the configurations indicated in different tables.

Specifically, with specific PDCCH subcarrier spacing and SSB subcarrier spacing, the terminal may look up the table corresponding to the minimum channel bandwidth supported by n79 of 40 MHz and the table corresponding to the minimum channel bandwidth supported by nX of 10 MHz, respectively. In another method, when the terminal resides on a specific frequency band, the bit information in the PBCH load is used to determine the frequency band number of the frequency band on which the terminal resides, which is used to determine the CORESET0 configuration table. This method is more direct with an explicit indication, and the terminal does not need to traverse multiple CORESET0 configuration tables, and has smaller detection latency and power consumption. In an embodiment, when the terminal supports both the n79 and nX frequency bands and the frequency point where the terminal resides is in the overlapped frequency band of n79 and nX, whether the frequency band is n79 or nX is determined according to the reserved bits of the PBCH, and then the respective CORESET0 configuration table is looked up according to the determination result.

In an embodiment, when the downlink frequency band on which the terminal resides or uses is a specific FR1 frequency band (e.g., the RMR-900 frequency band, n8, n26, n28), the terminal may identify, check or look up a new table to determine CORESET0 configuration information. The terminal may determine the number of RBs, the number of symbols and the offset value of CORESET0 according to (or, based on) a new table that supports the minimum bandwidth of 3 MHz and parameter controlResourceSetZero, wherein in order to ensure that CORESET0 is within the effective bandwidth of the channel, the number of RBs in the new table may be within an available bandwidth range of less than 5 MHz (e.g., 3 MHz), and because one CCE contains 6 resource element groups (REG), the RB number may be a multiple of 6, with optional values being 6, 12, and 18. This method is applicable to a scenario where terminals in a system with a specific channel bandwidth on a specific frequency band all support a minimum channel bandwidth of less than 5 MHz.

In one embodiment, the terminal performs signal reception and/or resource configuration information acquisition according to (or, based on) the downlink frequency band information. For example, in case that a frequency band on which the MIB is received is a second frequency band, the terminal may determine the configuration information for the coreset based on the at least one SCS. For example, the second frequency band includes n79.

In an embodiment, the terminal may determine the configuration information of CORESET0 in the PBCH to receive the PDCCH for the SIB1. For example, the terminal may receive, from a base station, a master information block (MIB) on a physical broadcast channel (PBCH). The MIB may include information on at least one sub-carrier spacing (SCS).

The terminal may first determine capabilities of the terminal. When (or, in case that) the terminal supports a specific channel bandwidth on a specific frequency band and/or the terminal is a reduced-capability terminal (or, reduced-capability user equipment (UE) or Red-Cap UE), and the downlink frequency band on which the terminal resides or uses is a predefined frequency band, the terminal may determine the CORESET0 configuration information by identifying, checking or looking up the existing table according to (or, based on) the downlink frequency band information. And then the terminal may perform PDCCH reception for the SIB. For example, the terminal may perform PDCCH reception for the SIB based on determined CORESET0 configuration information.

According to an embodiment, when (or, in case that) the capability of the terminal does not support a specific channel bandwidth on a specific frequency band, or the downlink frequency band on which the terminal resides is not a predefined frequency band (or, the downlink frequency band on which the terminal resides is not included in the predefined frequency band), or the downlink frequency band on which the terminal resides or uses does not support the specific channel bandwidth on the specific frequency band (not supportable), the terminal may identify, check or look up the existing table according to the minimum channel bandwidth supported by the downlink frequency band, SSB Subcarrier spacing and PDCCH subcarrier spacing.

In an embodiment, a system with a specific channel bandwidth on a specific frequency band may be or may include a frequency band n79 or the newly defined frequency band nX, where the channel bandwidth is 10 MHz, 20 MHz, wherein the newly defined frequency band and the n79 frequency band have overlap.

The minimum channel bandwidth supported by the existing n79 is 40 MHz. After 10 MHz and/or 20 MHz channel bandwidth is introduced into this frequency band (e. g., n79 frequency band), the minimum channel bandwidth supported by the n79 is 10 MHz or 20 MHz, as shown in Table 3.

TABLE 3

Channel Bandwidths of NR bands
NR BAND/SCS/UE CHANNEL BANDWIDTH

| NR BAND | SCS kHz | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|---|
| n79 | 15 |  |  |  |  |  |  | YES | YES |  |  |  |  |  |
|  | 30 |  | YES |  | YES |  |  | YES | YES | YES |  | YES |  | YES |
|  | 60 |  |  |  |  |  |  | YES | YES | YES |  | YES |  | YES |

In an embodiment, when the downlink frequency band on which the terminal resides or uses is n79/nX, and the terminal supports a specific channel bandwidth on a specific frequency band and/or the terminal is a reduced-capability terminal (or, reduced-capability UE or Red-Cap UE), the terminal may determine the CORESET0 configuration information by identifying, checking or looking up the table according to the frequency band n79/nX.

In an embodiment, when the downlink frequency band on which the terminal resides or uses is n79/nX, and the terminal does not support the specific bandwidth on the specific frequency band, the terminal may determine the CORESET0 configuration information by identifying, checking or looking up the table according to (or, based on) the minimum bandwidth of 40 MHz, the SSB subcarrier spacing of 30 KHz, and the PDCCH subcarrier spacing of 30 KHz. The method may allow two types of terminals to identify, check or look up the same table, thereby ensuring that the system can support the two types of terminals at the same time, and CORESET0 has more configurable parameters. Taking frequency band n as an example in Table 4 below, when the system bandwidth is 10 MHz, the indexes of CORESET RB number configuration 0, 1, 2, and 3 are valid configurations. This method is different from determining the minimum channel bandwidth according to the frequency bands, with which determining the table according to the minimum channel bandwidth, but directly determining the configuration information of CORESET0 according to the downlink frequency band information.

Table 4 illustrates Set of resource blocks and slot symbols of CORESET for Type0-PDCCH search space set when {SS/PBCH block, PDCCH} SCS is {30, 30} kHz for frequency bands with minimum channel bandwidth 40 MHz or for the frequency band n79.

TABLE 4

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 24 | 3 | 0 |
| 3 | 1 | 24 | 3 | 4 |
| 4 | 1 | 48 | 1 | 0 |
| 5 | 1 | 48 | 1 | 28 |
| 6 | 1 | 48 | 2 | 0 |
| 7 | 1 | 48 | 2 | 28 |
| 8 | 1 | 48 | 3 | 0 |
| 9 | 1 | 48 | 3 | 28 |
| 10 | reserved | reserved | reserved | reserved |
| 11 | reserved | reserved | reserved | reserved |
| 12 | reserved | reserved | reserved | reserved |
| 13 | reserved | reserved | reserved | reserved |
| 14 | reserved | reserved | reserved | reserved |
| 15 | reserved | reserved | reserved | reserved |

The above-described embodiments may be combined. For example, the UE may identify a frequency band on which the MIB is received, in case that the frequency band is a first frequency band, determine configuration information for a coreset for a physical downlink control channel (PDCCH) based on a minimum channel bandwidth of the first frequency band and the at least one SCS, and in case that the frequency band is a second frequency band, determine the configuration information for the coreset based on the at least one SCS.

In one embodiment, the terminal performs signal reception and/or resource configuration information acquisition according to (or, based on) information of the bandwidth on which the cell resides. In an embodiment, the terminal may determine the configuration information of CORESET0 to receive the PDCCH for the SIB1.

The terminal may first determine capabilities of the terminal. When the capability of the terminal support a specific channel bandwidth on a specific frequency band, and the downlink frequency band is a predefined frequency band and/or the channel bandwidth is a specific value, the terminal may determine the CORESET0 configuration information by identifying, checking or looking up the existing table or a newly added predefined (or, specific) table according to (or, based on) the channel bandwidth information, and then the terminal may perform PDCCH reception for the SIB. The parameters in the existing table are converted according to the predefined values. The predefined value is related to the system bandwidth. The number of RBs in the newly added predefined table may be a multiple of 6, and the frequency band occupied by the RBs may be smaller than the effective bandwidth of the system.

When the capability of the terminal do not support a specific channel bandwidth on a specific frequency band, or the downlink frequency band is not a predefined frequency band or the downlink frequency band does not support a specific channel bandwidth on a specific frequency band, or the channel bandwidth is not a specific value, the terminal may identify, check or look up the existing table (or, specific table) according to the (or, based on) minimum channel bandwidth supported by the downlink frequency band on which the terminal resides, SSB subcarrier spacing and PDCCH subcarrier spacing.

The method may ensure that CORESET0 is transmitted within the effective bandwidth of the system when the system bandwidth is less than 5 MHz.

When the terminal identifies that the system channel bandwidth is greater than or equal to 5 MHz, even if the minimum system bandwidth supported by the frequency band is less than 5 MHz, the terminal may still define CORESET0 related parameters according to the values in the existing table, thereby ensuring that the system bandwidth is greater than or equal to the coverage of PDCCH for the SIB1 in the 5 MHz system. In an embodiment, after the terminal determines that the channel bandwidth is a specific value, the terminal may multiplex or identify the table with the minimum bandwidth of 5 MHz. And the SSB subcarrier spacing and the PDCCH subcarrier spacing both may be 15 kHz. Since the minimum number of RBs in CORESET0 in Table 5 is 24, when the subcarrier spacing is 15 KHz, its frequency band is 4.32 MHz, which may exceed the minimum channel bandwidth (e.g., 3 MHz to 5 MHz). At this point, the number of RBs in Table 5 may be taken by the terminal as a value divided by a predefined value or a value added with a predefined value.

Similarly, the terminal may add a predefined value to the offset value in the table. For example, the terminal divides the number of RBs in the table by 2 to obtain the number of RBs in CORESET0. At this point, the occupied frequency band is 2.16 MHz, which is within the minimum channel bandwidth supported by the system. The predefined value may be a fixed value or may be indicated in the PBCH payload.

Table 5 illustrates Set of resource blocks and slot symbols of CORESET for Type0-PDCCH search space set when {SS/PBCH block, PDCCH} SCS is {15, 15} kHz for frequency bands with minimum channel bandwidth 5 MHz or 10 MHz, or channel bandwidth below 5 MHz

TABLE 5

| Index | SS/PBCH block and CORESET multiplexing pattern | Number of RBs | Number of Symbols | Offset (RBs) |
| --- | --- | --- | --- | --- |
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | reserved | reserved | reserved | reserved |

In an embodiment, after the terminal may determine that the channel bandwidth is a specific value, the terminal may determine the CORESET0 position according to the following newly defined table. The terminal may determine the number of RBs, the number of symbols and the offset value of CORESET0 according to the newly defined table with the bandwidth less than 5 MHz and the parameter controlResourceSetZero. In the newly defined table, the number of RBs may be within the available bandwidth range of less than 5 MHz (e.g., 3 MHz), and since a CCE contains 6 REGs, the number of RBs may be a multiple of 6, with optional values being 6, 12, 18. In the frequency band that supports a minimum channel bandwidth of less than 5 MHz (e.g., 3 MHz), when the terminal identifies that the channel bandwidth of the system is less than 5 MHz, the terminal determines CORESET0 related parameters according to the new table. When the terminal determines the channel bandwidth of the system is greater than or equal to 5 MHz, the terminal determines the CORESET0 related parameters according to the existing method.

Figure 6:
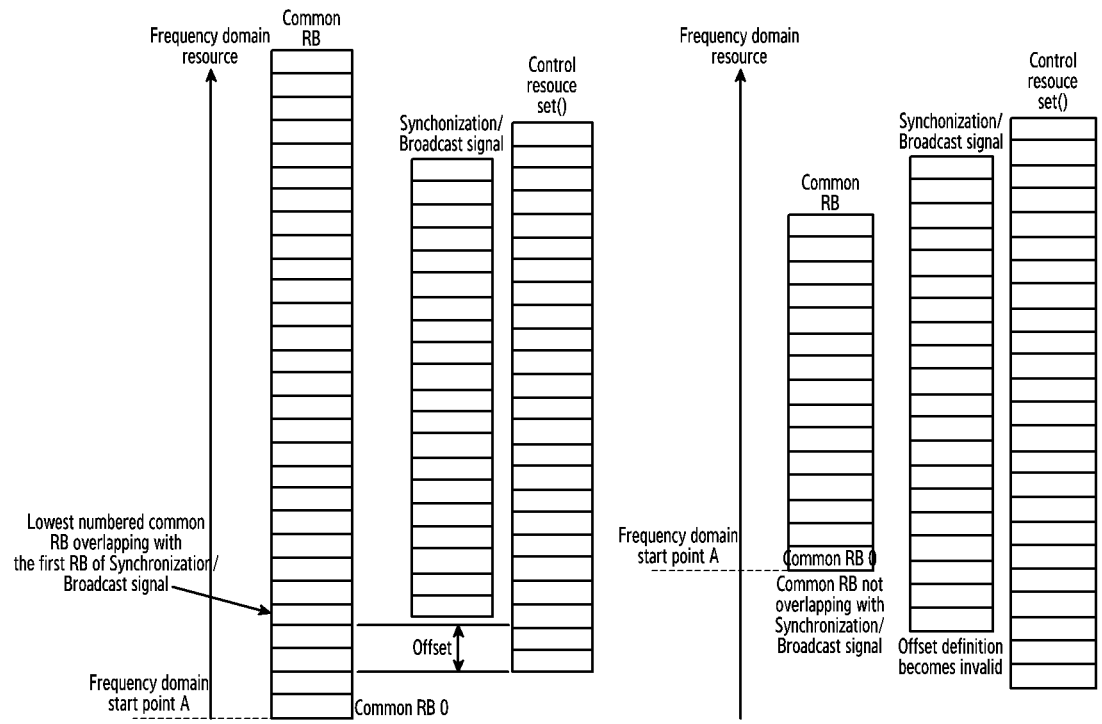
FIG. 6 illustrates an example of a scenario where the offset value definition becomes invalid.

When the bandwidth of the SSB is larger than the effective bandwidth of the system, the position of the start point of the frequency domain of the SSB resultantly is not within the available bandwidth of the frequency band. For example, in the table for determining the CORESET0 configuration parameters, the definition of offset is currently determined as the number of RBs from the lowest numbered RB occupied by the CORESET of Type0-PDCCH CSS to the lowest numbered common RB. The lowest numbered common RB and the first RB occupied by the SSB have overlap. And for the case where the system bandwidth is less than 5 MHz, it may occur that the first RB of the SSB may not be within the available bandwidth. Since the subcarrier 0 of the common RB0 is aligned with pointA, with numbering afterwards starting from 0, at this point, the common RB0 may not have overlap with the first RB of the SSB, which invalidates the definition, as shown in FIG. 6 (taking the same SSB subcarrier spacing and channel subcarrier spacing as an example).

Figure 7:
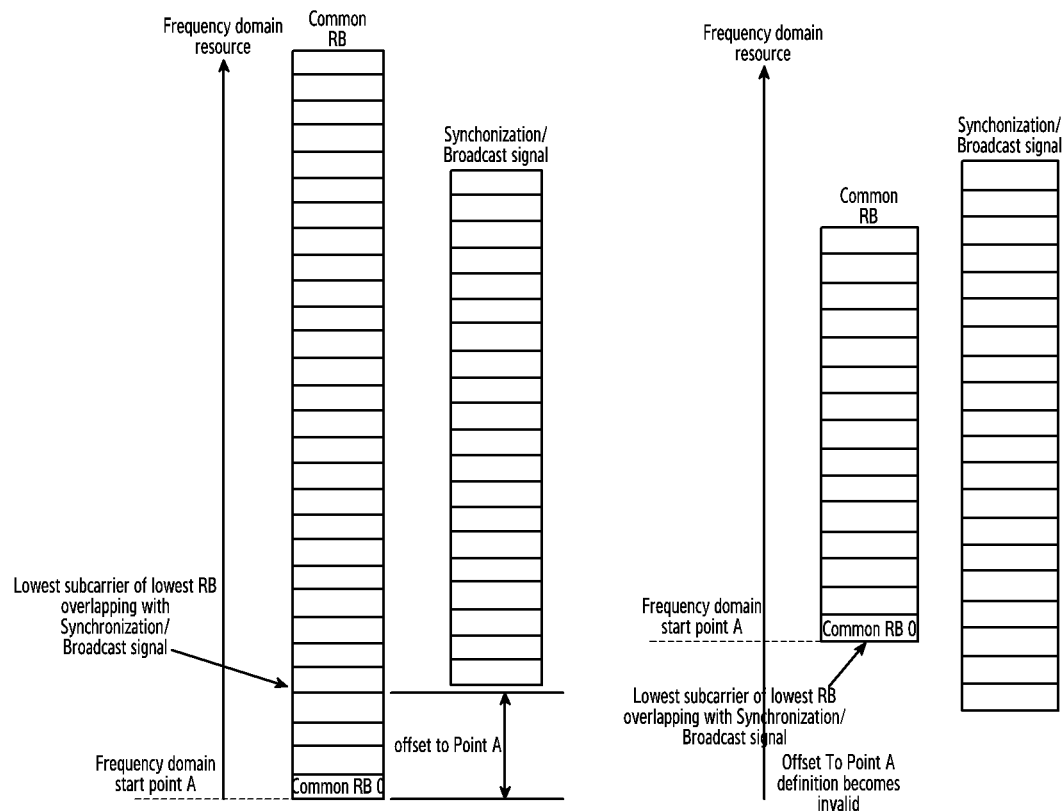
FIG. 7 illustrates an example of a invalidity of offsetToPointA definition according to an embodiment of the present disclosure.

Similarly, the terminal obtains the parameter offsetToPointA from the SIB1 message, which is currently defined as the frequency domain spacing from pointA to the lowest subcarrier of the lowest RB overlapping with the SSB. For a system with a bandwidth of less than 5 MHz, it may occur that the first RB of the SSB is not within the available bandwidth, thus invalidating the existing definition of offsetToPointA, as shown in FIG. 7.

Similarly, the terminal obtains the parameter Kssb after obtaining the MIB (5 bits may represent a maximum value of 31). The existing parameter is defined as the subcarrier spacing from subcarrier 0 of the common $RBN_{CRB}^{SSB}$ to subcarrier 0 of the SSB, wherein the common $RBN_{CRB}^{SSB}$ is obtained from the higher-layer parameter offsetToPointA. For a system with a bandwidth of less than 5 MHz, if the existing definition of offsetToPointA is invalid, the definition of parameter Kssb is also meaningless.

In order to solve this problem, the following methods may be adopted to define related parameters in the second signal: the related parameters take PSS/SSS as the start point; and/or the value range of the related parameters is an extended value range. wherein the related parameters may be offset, offsetToPointA, and Kssb. The specific implementations are described in detail below:

The above-described embodiments an examples, may be combined.

In one embodiment, the related parameters are defined with PSS/SSS as the start point. The terminal may first determine capabilities of the terminal. When the capability of the terminal support a specific channel bandwidth on a specific frequency band, and the downlink frequency band on which the terminal resides is a predefined frequency band, and the system bandwidth on which the terminal resides or uses is a specific value, the terminal may determine the related parameters with PSS/SSS as the start point of the frequency domain, and then the terminal may perform PDCCH reception of SIB1 and determination of the start point of the carrier frequency domain.

When the capability of the terminal do not support a specific channel bandwidth on a specific frequency band, or the downlink frequency band on which the terminal resides is not a predefined frequency band, or the downlink frequency band on which the terminal resides or uses does not support the specific channel bandwidth on the specific frequency band, or the channel bandwidth is not a specific value, the terminal may determine the related parameters according to the start point of the SSB frequency band.

Since the PSS/SSS is within the available bandwidth, this method can simplify terminal processing.

Figure 8:
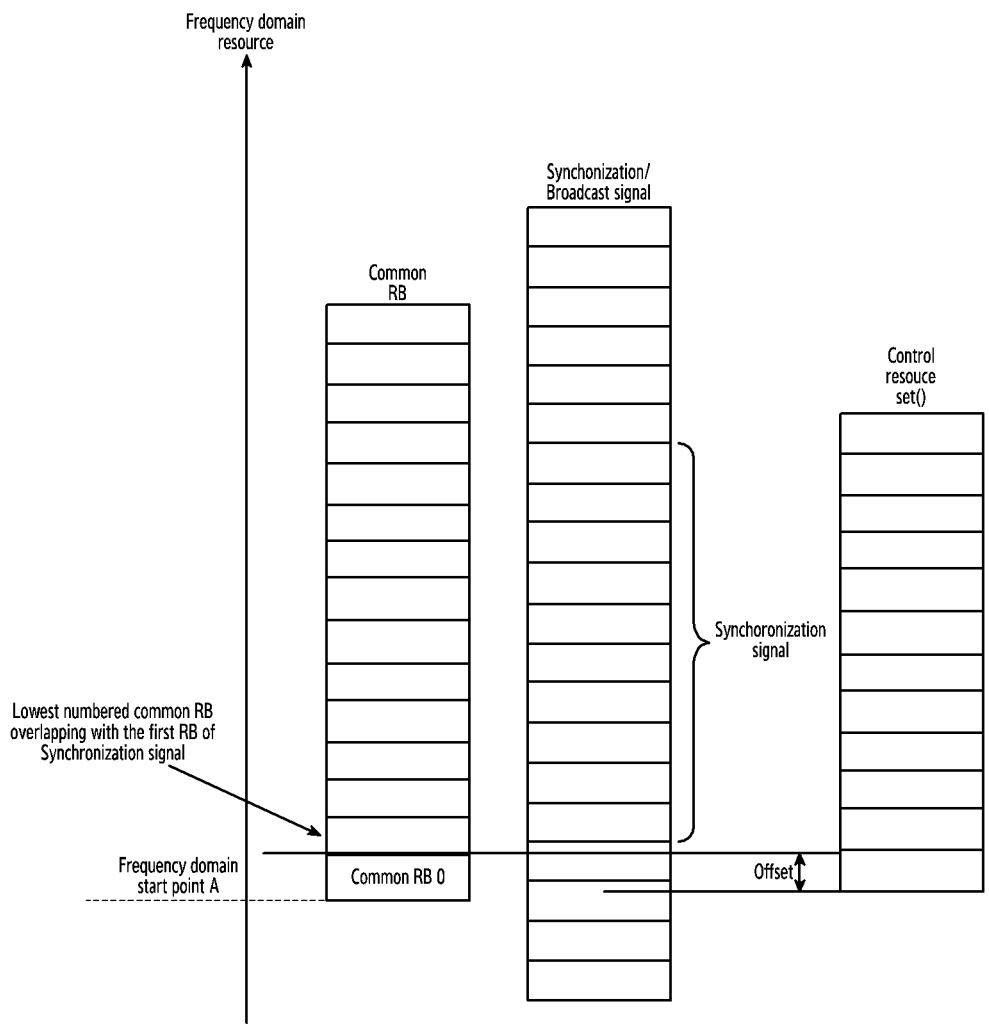
FIG. 8 illustrates an example of a related parameter offset value with PSS/SSS as a start point according to an embodiment of the present disclosure.
Figure 9:
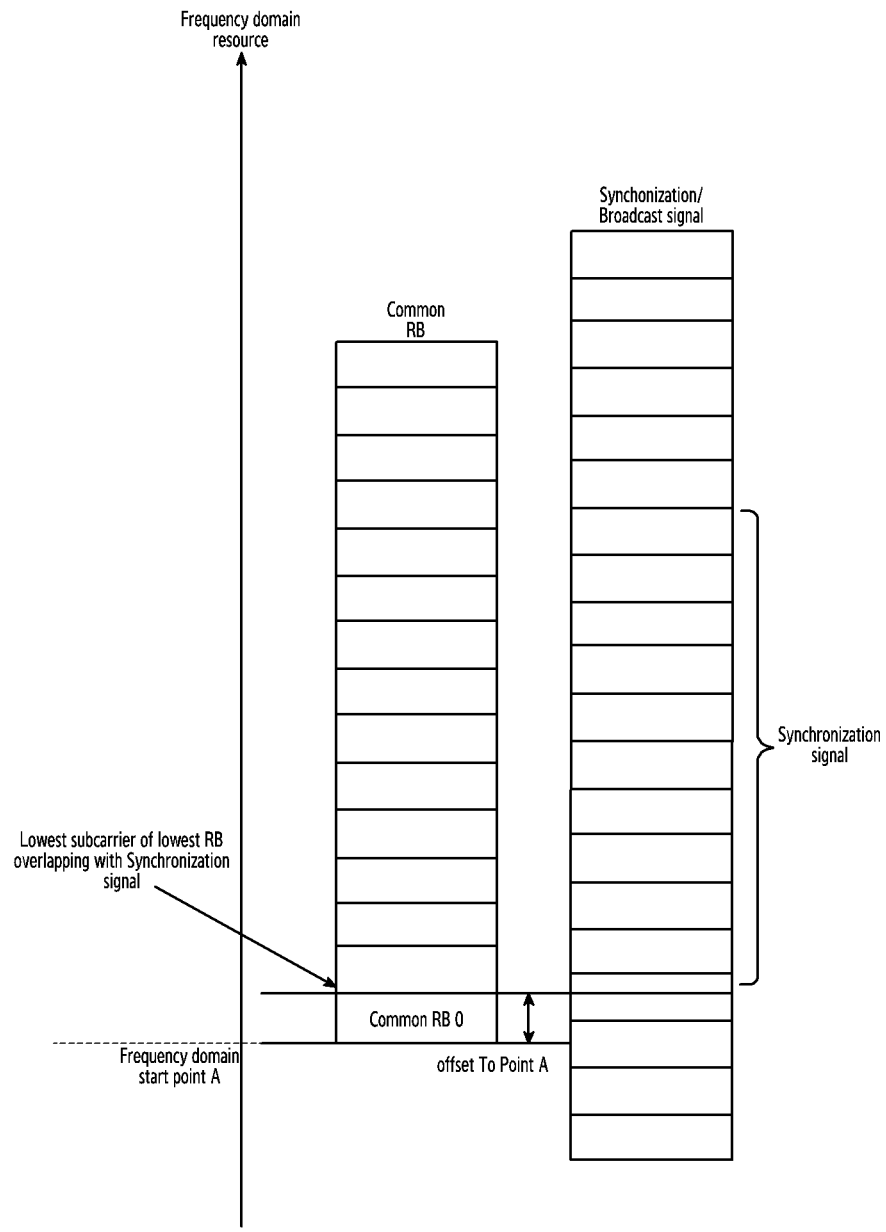
FIG. 9 illustrates an example of a related parameter frequency domain resource start point parameter offsetToPointA with PSS/SSS as a start point according to an embodiment of the present disclosure.

In an embodiment, when the downlink frequency band on which the terminal resides or uses supports a system of less than 5 MHz, the parameter may be defined according to the PSS/SSS start point RB, that is, the offset value in controlResourceSetZero is the number of RBs from the lowest numbered RB occupied by the CORESET of Type0-PDCCH CSS to the lowest numbered common RB, wherein the lowest numbered common RB has overlap with the first RB occupied by the PSS/SSS in the SSB, as shown in FIG. 8. Similarly, when the specific frequency band on which the terminal resides supports a system of less than 5 MHz, the parameter may be defined according to PSS/SSS as the start point, that is, offsetToPointA is the frequency domain spacing from pointA to the lowest subcarrier of the lowest RB of PSS/SSS in SSB, as shown in FIG. 9.

Figure 10:
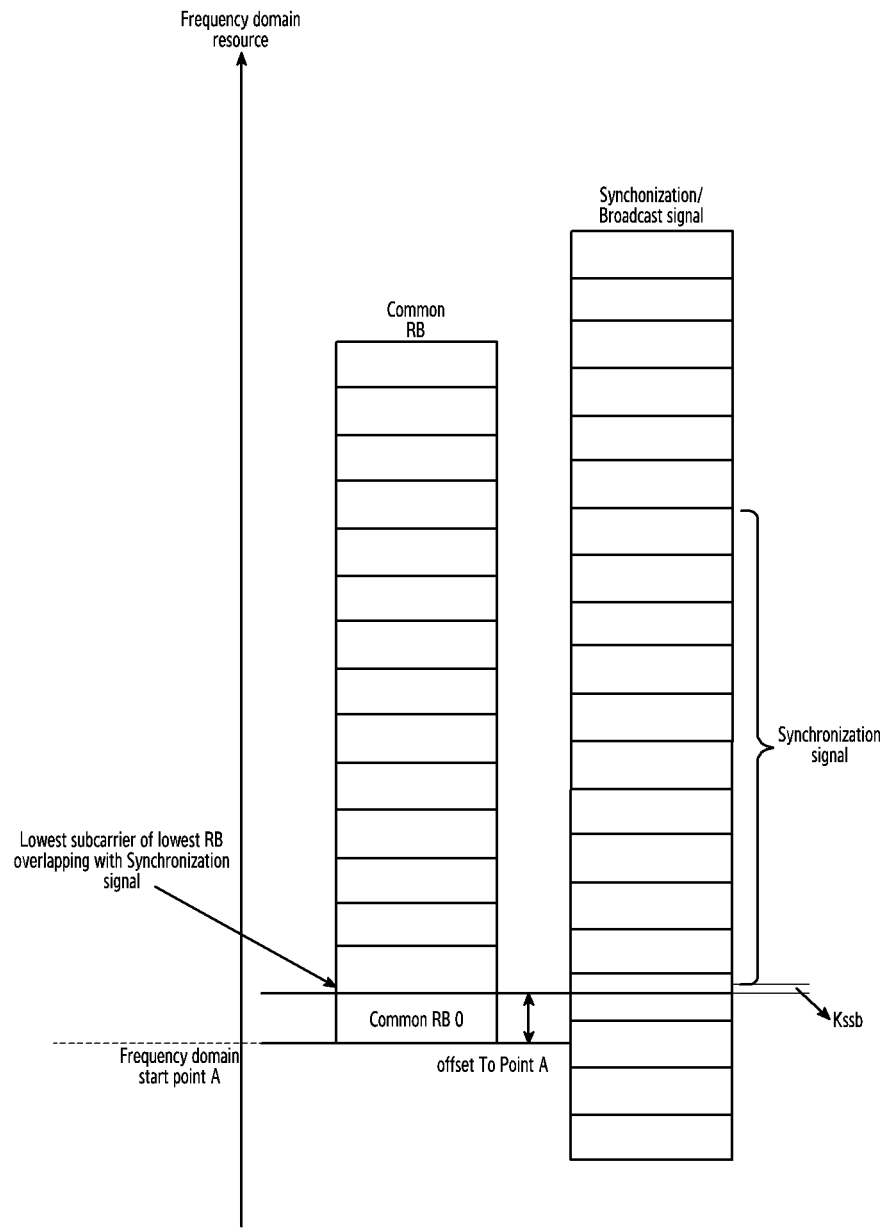
FIG. 10 illustrates an example of a related parameter Kssb with PSS/SSS as a start point according to an embodiment of the present disclosure.

Similarly, when the specific frequency band on which the terminal resides supports a system of less than 5 MHz, the related parameters may be defined according to PSS/SSS as the start point, wherein Kssb is the subcarrier (subcarrier 0) spacing from subcarrier 0 of the common $RBN_{CRB}^{SSB}$ to the first subcarrier of PSS/SSS in the SSB, and the common $RBN_{CRB}^{SSB}$ is obtained from the higher-layer parameter offsetToPointA, the parameter Kssb being defined as shown in FIG. 10.

In one embodiment, the value ranges of the related parameters are extended, such as by adding negative values. The terminal first determines its capabilities. When the capability of the terminal support a specific channel bandwidth on a specific frequency band, and the downlink frequency band is a predefined frequency band, and the system bandwidth on which the terminal resides is a specific value, the terminal determines the related parameters according to the extended parameter values, and then performs reception of PDCCH for the SIB1 and determination of the start point of the carrier frequency domain. When the capability of the terminal do not support a specific channel bandwidth on a specific frequency band, or the downlink frequency band on which the terminal resides is not a predefined frequency band, or the downlink frequency band on which the terminal resides does not support the specific channel bandwidth on the specific frequency band, or the channel bandwidth is not a specific value, the terminal determines the related parameters according to the existing values. In such a case, the method does not need to change the parameter definitions in the existing protocol, and has better compatibility.

Figure 11:
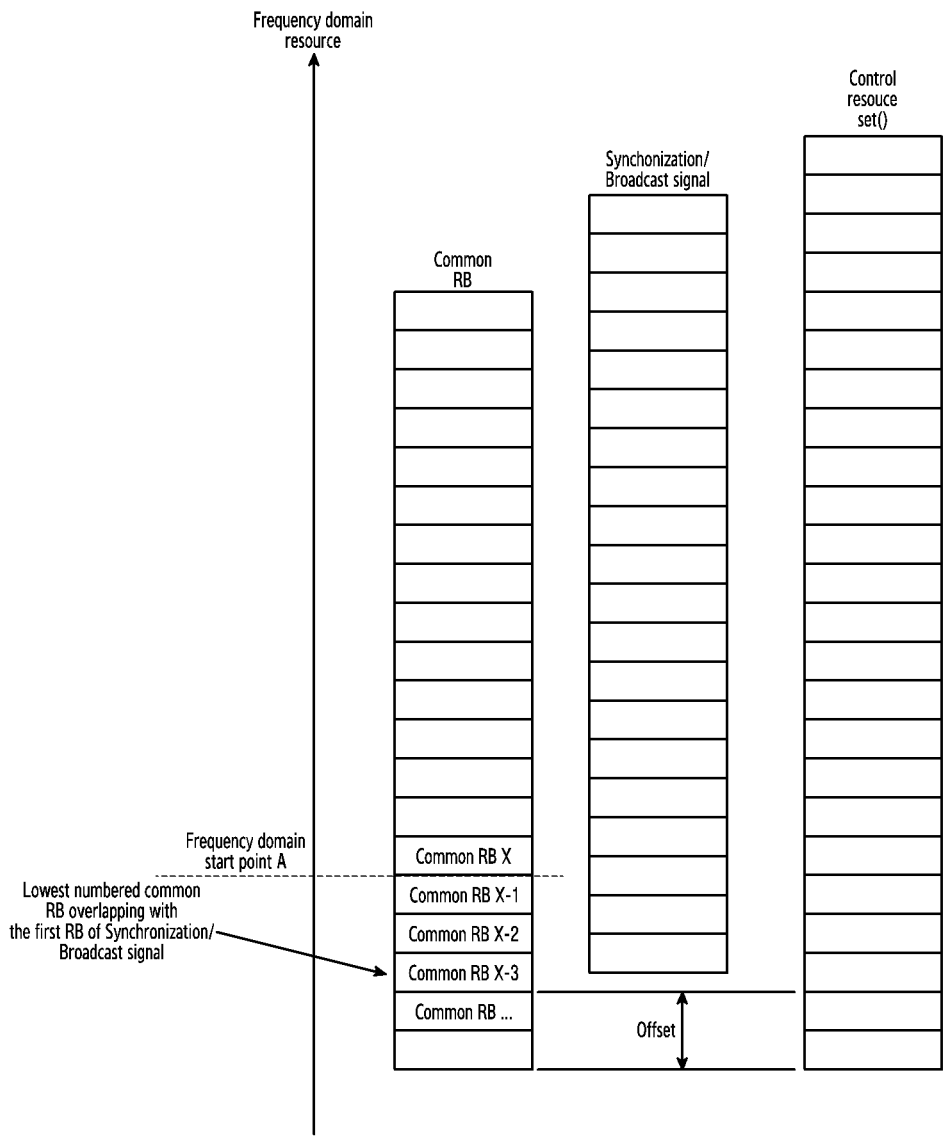
FIG. 11 illustrates an example of extending a value range of a related parameter offset value (offset) of a according to an embodiment of the present disclosure.

In an embodiment, when the specific frequency band on which the terminal resides supports a system of less than 5 MHz, the offset value in controlResourceSetZero is the number of RBs from the lowest numbered RB occupied by the CORESET of Type0-PDCCH CSS to the lowest numbered common RB, the lowest numbered common RB overlapping with the first RB occupied by the SSB, wherein subcarrier 0 of the common RBX is aligned with pointA, and the number of RBs below the frequency point of pointA is X–1, X–2, . . . . The X value may be configured in the MIB by a parameter. When X=0, the RB number below the frequency point of pointA is negative. The offset value (offset) is illustrated in FIG. 11.

Figure 12:
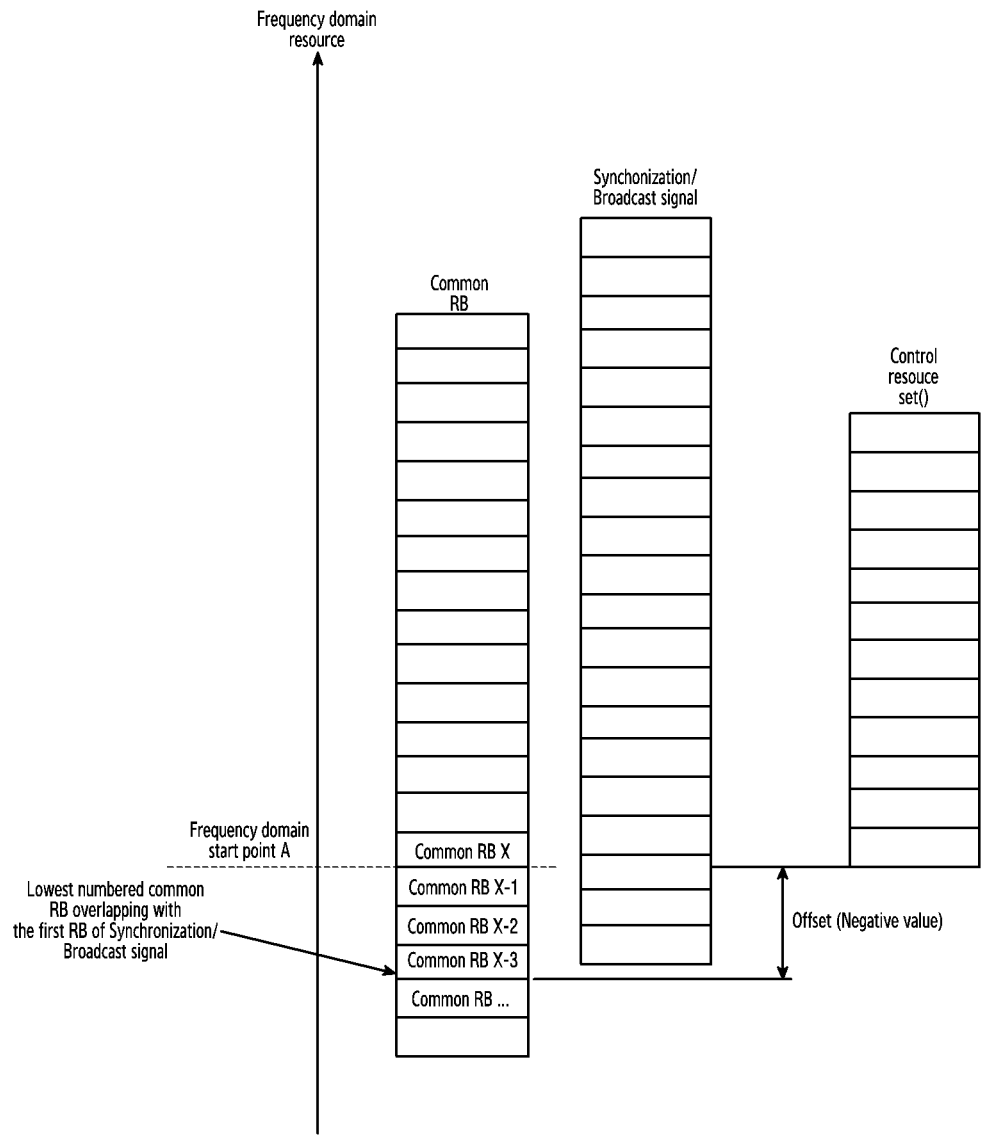
FIG. 12 illustrates an example of a related parameter offset taking a negative value according to an embodiment of the present disclosure.

When the frequency where the lowest numbered RB occupied by CORESET0 is located is greater than the frequency of the first RB of SSB, offset is illustrated in FIG. 12. At this point, the offset value may be a negative value, and the absolute value of the negative value is the number of RBs from the lowest numbered RB occupied by CORESET of Type0-PDCCH CSS to the lowest numbered common RB, wherein the lowest numbered common RB has overlap with the first RB occupied by SSB.

Figure 13:
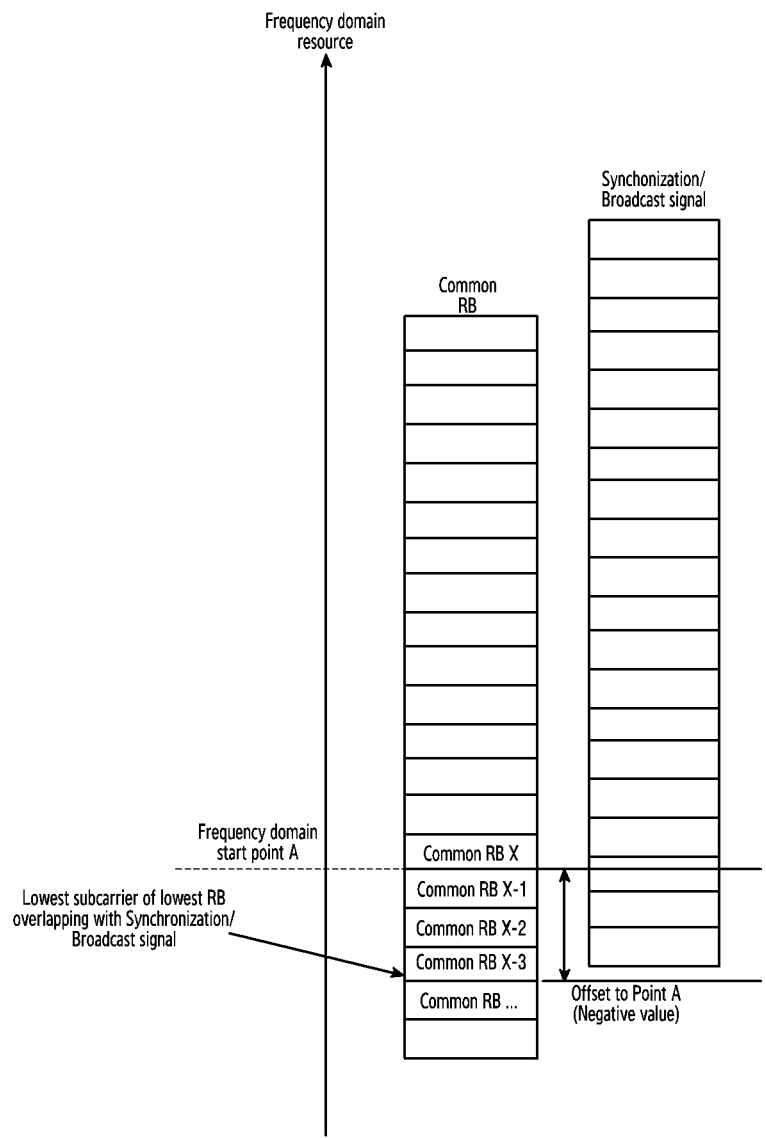
FIG. 13 illustrates an example of extending a value range of a related parameter offsetToPointA according to an embodiment of the present disclosure.

Similarly, offsetToPointA is currently defined as the frequency domain spacing from pointA to the lowest subcarrier of the lowest RB overlapping the SSB. Negative values are added to the value range of the parameter offsetToPointA. For example, the supported value range is INTEGER(X, 2199), wherein X is a negative integer. When the frequency where pointA is located is greater than the frequency where the lowest subcarrier of the lowest RB of the SSB is located, the value takes a negative number, and the absolute value of the value a represents the frequency domain spacing from pointA to the lowest subcarrier of the lowest RB that has overlap with the SSB, as shown in FIG. 13.

Figure 14:
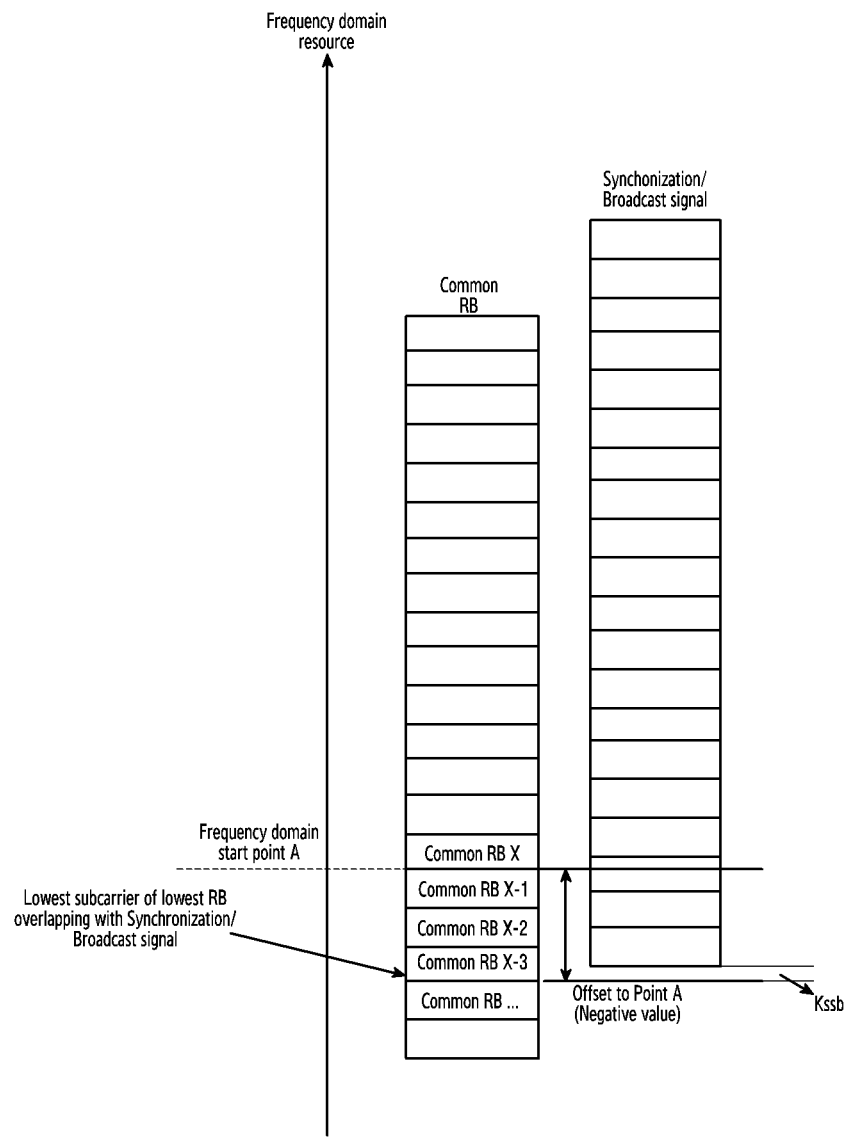
FIG. 14 illustrates an example of extending a value range of a related parameter Kssb according to an embodiment of the present disclosure.

At this point, Kssb is the spacing from the subcarrier of subcarrier 0 of the common RB to the subcarrier 0 of the SSB, wherein the common RB $N_{CRB}^{SSB}$ is indicated by the parameter offsetToPointA, as shown in FIG. 14.

Optionally, the terminal first determines its capabilities. When the capability of the terminal support a specific channel bandwidth on a specific frequency band, and the downlink frequency band is a predefined frequency band, and the channel bandwidth is a specific value, the terminal determines the related parameters according to the received parameter being a negative value, and then performs reception of PDCCH for the SIB1 and determination of the start point of the carrier frequency domain. When the capability of the terminal do not support a specific channel bandwidth on a specific frequency band, or the downlink frequency band on which the terminal resides is not a predefined frequency band or the downlink frequency band on which the terminal resides does not support the specific channel bandwidth on the specific frequency band, or the channel bandwidth is not a specific value, the terminal determines the related parameters according to the received value. In such a case, this method does not need to extend the parameter value, thereby reducing the bit overhead of signaling.

In an embodiment, in a specific frequency band/system, the frequency where pointA is located is greater than the frequency of the lowest subcarrier of the lowest RB of the SSB, and the parameter offsetToPointA represents the frequency domain spacing from the lowest carrier of the lowest RB of the SSB to pointA, in which case it is equivalent to define the received offsetToPointA as taking a negative value.

The terminal first determines whether it is a terminal that supports a specific channel bandwidth on a specific frequency band or supports a newly introduced frequency band, for example, supports a newly introduced channel bandwidth of 10 MHz\20 MHz in the n79 frequency band or supports a newly introduced frequency band nX. The terminal in the following method description is a terminal that supports the above capabilities.

The protocol introduces a new minimum channel bandwidth in the existing downlink frequency band, for example, introduces 10 MHz or 20 MHz in the n79 frequency band. At this point, the protocol defines a new synchronization raster spacing in the n79 band, as shown in the table below. A terminal that supports this feature may detect the new synchronization raster and the original synchronization raster in the n79 frequency band.

TABLE 6

| NR operating band | SS Block SCS | SS Block pattern[1] | Range of GSCN (First-<Step size>-Last) |
|---|---|---|---|
| n79 | 30 kHz | Case C | 8480-<16>-8880[7] |
|  |  |  | 8475-<1>-8884[8] |

NOTE[7]:
The SS raster entries apply for channel bandwidths larger than or equal to 40 MHz
NOTE[8]:
The SS raster entries apply for channel bandwidths smaller than 40 MHz In an embodiment, when the downlink frequency band on which the terminal resides is n79, and the terminal detects the SSB on the newly defined synchronization raster (and the newly defined synchronization raster does not overlap with the original defined synchronization raster), the terminal determines the CORESET0 parameter table according to the newly introduced minimum channel bandwidth (e.g., 10 MHz or 20 MHz) on n79, SSB subcarrier spacing, and CORESET0 subcarrier spacing. When the downlink frequency band on which the terminal resides is n79, and the terminal detects the SSB on the original synchronization raster, the terminal determines the CORESET0 parameter table according to the original minimum channel bandwidth of n79 (i.e., 40 MHz), SSB subcarrier spacing, and CORESET0 subcarrier spacing.

The terminal determines the CORESET0 parameter table according to the pre-defined synchronization raster of the frequency band on which the terminal resides. The terminal first determines the position of the SS synchronization raster where the terminal resides, and then looks up the CORESET0 configuration table corresponding to the synchronization raster position according to the predefined synchronization raster set.

In an embodiment, taking the {SSB, PDCCH} subcarrier spacing as {30, 15} kHz and the frequency band as n79 as an example, the terminal looks up the CORESET0 configuration table according to the predefined synchronization raster of the frequency band on which the terminal resides and (SSB, PDCCH) subcarrier spacing and the minimum channel bandwidth.

When the GSCN where the terminal resides does not fall into the GSCN set that uses 40 MHz as the minimum channel bandwidth, the terminal looks up the table as follows.

Table Numbers of RBs and symbols of CORESET0, when {SSB, PDCCH} subcarrier spacing is {30, 15} kHz and minimum channel bandwidth corresponding to a frequency band (excluding pre-defined synchronization raster GSCN value on the frequency band) is 5 MHz or 10 MHz.

TABLE 7

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 2 |
| 1 | 1 | 48 | 1 | 6 |
| 2 | 1 | 48 | 2 | 2 |
| 3 | 1 | 48 | 2 | 6 |
| 4 | 1 | 48 | 3 | 2 |
| 5 | 1 | 48 | 3 | 6 |
| 6 | 1 | 96 | 1 | 28 |
| 7 | 1 | 96 | 2 | 28 |
| 8 | 1 | 96 | 3 | 28 |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

When the GSCN where the terminal resides falls into the GSCN set that uses 10 MHz as the minimum channel bandwidth, the terminal looks up the table as follows.

Table Numbers of RBs and symbols of CORESET0, when {SSB, PDCCH} subcarrier spacing is {30, 15} kHz and minimum channel bandwidth corresponding to a frequency band is 5 MHz or 10 MHz or a pre-defined synchronization raster GSCN value on the frequency band.

TABLE 8

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 2 |
| 1 | 1 | 48 | 1 | 6 |
| 2 | 1 | 48 | 2 | 2 |
| 3 | 1 | 48 | 2 | 6 |
| 4 | 1 | 48 | 3 | 2 |
| 5 | 1 | 48 | 3 | 6 |
| 6 | 1 | 96 | 1 | 28 |
| 7 | 1 | 96 | 2 | 28 |
| 8 | 1 | 96 | 3 | 28 |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

When the GSCN where the terminal resides falls into the GSCN set that uses 40 MHz as the minimum channel bandwidth, the terminal looks up the table as follows.

Table Numbers of RBs and symbols of CORESET0, when {SSB, PDCCH} subcarrier spacing is {30, 15} kHz and minimum channel bandwidth corresponding to a frequency band is 40 MHz or a pre-defined synchronization raster GSCN value on the frequency band.

TABLE 9

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 4 |
| 1 | 1 | 48 | 2 | 4 |
| 2 | 1 | 48 | 3 | 4 |
| 3 | 1 | 96 | 1 | 0 |
| 4 | 1 | 96 | 1 | 56 |
| 5 | 1 | 96 | 2 | 0 |
| 6 | 1 | 96 | 2 | 56 |
| 7 | 1 | 96 | 3 | 0 |
| 8 | 1 | 96 | 3 | 56 |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

In an embodiment, the terminal determines the minimum channel bandwidth value in the CORESET0 parameter table according to the GSCN set in the predefined synchronization raster on the frequency band on which the terminal resides. When the GSCN value of the synchronization raster where the terminal resides falls into the predefined GSCN set, the minimum channel bandwidth used for looking up the CORESET0 parameter table is the predefined value as shown in the table below.

TABLE 10

| NR Band | SS Block Subcarrier Spacing | SS Block Mode | GSCN Range (from-<step>-to) |
|---|---|---|---|
| n79[9] | 30 kHz | Case C | 8480-<16>-8880[7] 8475-<1>-8884[8] |

NOTE[9]:
For GSCNs in the following synchronization rasters, 40 MHz is used as the minimum channel bandwidth to determine in CORESET0 Configuration Tables 13-1 to 13-10 in [13, 38.213]: GSCN 8480, 8496, 8512, 8528, 8544, 8560, 8576, 8592, 8608, 8624, 8640, 8656, 8672, 8688, 8704, 8720, 8736, 8752, 8768, 8784, 8800, 8816, 8832, 8848, 8864, 8880 and/or
For GSCNs in the following synchronization raster, 10 MHz is used as the minimum channel bandwidth to determine in CORESET0 Configuration Tables 13-1 to 13-10 in [13, 38.213]: 8475-<1>-8884, excluding GSCN 8480, 8496, 8512, 8528, 8544, 8560, 8576, 8592, 8608, 8624, 8640, 8656, 8672, 8688, 8704, 8720, 8736, 8752, 8768, 8784, 8800, 8816, 8832, 8848, 8864, 8880.

The terminal determines the CORESET0 configuration table according to the predefined minimum channel bandwidth of the frequency band on which the terminal resides.

In an embodiment, when the terminal detects the SSB on the synchronization raster corresponding to frequency band n79, the terminal determines the CORESET0 parameter table according to the minimum channel bandwidth (e.g., 10 MHz or 20 MHz) newly introduced on n79, SSB subcarrier spacing, and CORESET0 subcarrier spacing.

In an embodiment, when the terminal detects the SSB on the synchronization raster corresponding to frequency band n79, the terminal determines the CORESET0 parameter table according to the minimum channel bandwidth (e.g., 40 MHz) specified on n79, SSB subcarrier spacing, and CORESET0 subcarrier spacing. In such a case, the pre-defined minimum channel bandwidth of the frequency band is shown in the following table.

Table 11 Channel bandwidths in NR bands

TABLE 11

NR band/SCS/UE CHANNEL BANDWIDTH

| NR band | SCS kHz | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|---|
| n79[11] | 15 | | 10 | | 20 | | 30 | 40 | 50 | | | | | |
| | 30 | | 10 | | 20 | | 30 | 40 | 50 | 60 | 70[4] | 80 | 90 | 100 |
| | 60 | | 10 | | 20 | | 30 | 40 | 50 | 60 | 70[4] | 80 | 90 | 100 |

Note11: For this band, 40 MHz is used as the minimum channel bandwidth used to determine CORESET0 configuration tables 13-1 to 13-10 in [13, 38.213].

The terminal determines the CORESET0 configuration table according to the predefined frequency band.

Taking the {SSB, PDCCH} subcarrier spacing as {30, 15}kHz as an example, the terminal looks up the CORESET0 configuration table according to the predefined minimum channel bandwidth of the frequency band on which the terminal resides, as well as the {SSB, PDCCH} subcarrier spacing and the minimum channel bandwidth. When the frequency band on which the terminal resides is the pre-defined frequency band n79, the terminal looks up the table as follows.

Table 12 illustrates Set of resource blocks and slot symbols of CORESET for Type0-PDCCH search space set when {SS/PBCH block, PDCCH} SCS is {30, 15} kHz for frequency bands with minimum channel bandwidth 40 MHz or for the pre-defined frequency bands

TABLE 12

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 4 |
| 1 | 1 | 48 | 2 | 4 |
| 2 | 1 | 48 | 3 | 4 |
| 3 | 1 | 96 | 1 | 0 |
| 4 | 1 | 96 | 1 | 56 |
| 5 | 1 | 96 | 2 | 0 |
| 6 | 1 | 96 | 2 | 56 |
| 7 | 1 | 96 | 3 | 0 |
| 8 | 1 | 96 | 3 | 56 |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

Table 13 illustrates Set of resource blocks and slot symbols of CORESET for Type0-PDCCH search space set when {SS/PBCH block, PDCCH} SCS is {30, 15} kHz for frequency bands with minimum channel bandwidth 5 MHz or 10 MHz except for the pre-defined frequency bands.

For example, in case that a frequency band on which the MIB is received is a first frequency band, the UE may determine the configuration information for the CORESET based on the at least SCS and a minimum channel bandwidth of the first frequency band. For example, a frequency band on which the MIB is received is a second frequency band, the UE may determine the configuration information for the CORESET based on the at least SCS.

For example, the first frequency band may correspond to frequency bands with minimum channel bandwidth 5 MHz or 10 MHz. For example, the second frequency band may correspond to pre-defined frequency bands in the Table 12.

For example, in case that the frequency band is a first frequency band, determining configuration information for a control resource set (CORESET) for a Type0 physical downlink control channel (PDCCH) search space set based on a minimum channel bandwidth of the first frequency band, and in case that the frequency band is a second frequency band including a n79 frequency band, determining the configuration information for the CORESET corresponding to the n79 frequency band.

The above-described description for the first frequency band and the second frequency band is merely an example, and not limit the disclosure.

TABLE 13

| INDEX | SS/PBCH Block & CORESET Multiplexing pattern | Number of RB $N_{RB}^{CORESET}$ | Number of Symbol $N_{symb}^{CORESET}$ | Offset (RBs) |
|---|---|---|---|---|
| 0 | 1 | 48 | 1 | 2 |
| 1 | 1 | 48 | 1 | 6 |
| 2 | 1 | 48 | 2 | 2 |
| 3 | 1 | 48 | 2 | 6 |
| 4 | 1 | 48 | 3 | 2 |
| 5 | 1 | 48 | 3 | 6 |
| 6 | 1 | 96 | 1 | 28 |
| 7 | 1 | 96 | 2 | 28 |
| 8 | 1 | 96 | 3 | 28 |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

In an embodiment, when the terminal detects the SSB on the synchronization raster corresponding to the frequency band n79, the terminal determines the CORESET0 parameters according to the frequency band value n79. For example, the terminal determines the CORESET0 parameter table according to the frequency band n79, the SSB subcarrier spacing, and the CORESET0 subcarrier spacing.

The protocol introduces a new frequency band and defines the channel bandwidths supported on this frequency band. For example, the frequency band nX that has overlap with the n79 frequency band is introduced, in addition to supporting all the channel bandwidths defined by n79, the nX also has 10 MHz or 20 MHz introduced on it, as shown in the table below. At this point, the protocol defines a new synchronization raster spacing on the nX band, as shown in the table below.

TABLE 14

| NR Band/SCS/UE CHANNEL BANDWIDTH | | | | | | | | | | | | | | |
|---|---|---|---|---|---|---|---|---|---|---|---|---|---|---|
| NR Band | SCS kHz | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
| nX | 15 | | 10 | | 20 | | 30 | 40 | 50 | | | | | |
| | 30 | | 10 | | 20 | | 30 | 40 | 50 | 60 | $70^4$ | 80 | 90 | 100 |
| | 60 | | 10 | | 20 | | 30 | 40 | 50 | 60 | $70^4$ | 80 | 90 | 100 |

TABLE 15

| NR operating band | SS Block SCS | SS Block pattern[1] | Range of GSCN (First-<Step size>-Last) |
|---|---|---|---|
| n79 | 30 kHz | Case C | 8480-<16>-8880 |
| nX | 30 kHz | Case C | 8475-<1>-8884 |

In an embodiment, when the terminal detects the SSB on the synchronization raster corresponding to the newly defined frequency band nX, the terminal determines the CORESET0 parameter table according to the minimum channel bandwidth (e.g., 10 MHz or 20 MHz) in nX, SSB subcarrier spacing, and CORESET0 subcarrier spacing.

In an embodiment, when the terminal detects the SSB on the synchronization raster corresponding to the newly defined frequency band nX, the terminal determines the CORESET0 parameters according to the specified minimum bandwidth, for example, the terminal determines the CORESET0 parameter table according to the minimum channel bandwidth (e.g., 40 MHz) specified in nX, SSB subcarrier spacing, and CORESET0 subcarrier spacing.

In an embodiment, when the terminal detects the SSB on the synchronization raster corresponding to the newly defined frequency band nX, the terminal determines the CORESET0 parameters according to the frequency band value nX, for example, the terminal determines the CORESET0 parameter table according to the frequency band nX, the SSB subcarrier spacing, and the CORESET0 subcarrier spacing.

In an embodiment, when the terminal detects the SSB on a synchronization raster corresponding to the newly defined frequency band nX, and the synchronization raster is also the synchronization raster of another frequency band nY, the terminal determines the CORESET0 parameters by looking up two tables according to minimum CHANNEL BANDWIDTHs corresponding to two frequency band values nX\nY, respectively. For example, the terminal determines CORESET0 parameter table A according to the minimum channel bandwidth corresponding to frequency band nX, SSB subcarrier spacing, and CORESET0 subcarrier spacing, and determines CORESET0 parameter table B according to the minimum channel bandwidth corresponding to frequency band nY, SSB subcarrier spacing, and CORESET0 subcarrier spacing. The terminal performs CORESET0 detections according to the parameters in the two tables respectively. When the terminal detects the SSB on the synchronization raster corresponding to the newly defined frequency band nX, and the synchronization raster does not overlap with the synchronization raster of other frequency bands nY, the terminal determines the CORESET0 parameter table according to the minimum channel bandwidth corresponding to nX, SSB subcarrier spacing, and CORESET0 subcarrier.

While one or more embodiments have been described with reference to the accompanying drawings, persons skilled in the art will understand that various changes in form and details may be made therein without departing from the spirit and scope as defined by the appended claims.

According to an embodiment, a method performed by the UE is provided. The method comprises performing signal reception and/or resource configuration information acquisition based on a specified minimum channel bandwidth of a downlink frequency band, a synchronization signal/broadcast channel block SSB subcarrier spacing, a physical downlink control channel PDCCH subcarrier spacing, downlink frequency band information and a channel bandwidth.

The channel bandwidth is determined by the terminal according to the downlink frequency band information, capability of the terminal and a first signal received by the terminal. The resource configuration information is the configuration information transmitted in a second signal received by the terminal.

The first signal includes at least one of a Primary Synchronization Signal/Secondary Synchronization Signal PSS/SSS, a master information block (MIB) transmitted in a physical broadcast channel (PBCH), a payload other than the master information block (MIB) transmitted in PBCH and a system information (SIB).

The second signal includes at least one of a master information block (MIB) transmitted in PBCH, a payload other than the master information block (MIB) transmitted in the PBCH and a system information (SIB).

In the case the first signal is PSS/SSS, the channel bandwidth is determined based on a value range of a parameter of a PSS/SSS sequence, wherein the value range is related to the capability of the terminal.

The channel bandwidth is determined based on parameter Kssb in the master information block (MIB) transmitted in PBCH, and/or the channel bandwidth is determined based on reserved bits in a payload other than the master information block (MIB) transmitted in PBCH.

When the frequency band is the Railway Mobile Radio RMR-900 frequency band, n8, n26 or n28, the channel bandwidth is less than 5 MHz and/or when the frequency band is on n79 or a newly defined frequency band nX, the channel bandwidth is at least one of 10 MHz and 20 MHz. The newly defined frequency band nX and n79 have overlap.

The resource configuration information is configuration parameters transmitted in the second signal received by the terminal. The configuration parameters take PSS/SSS as a start point and/or a value range of the configuration parameter is an extended value range.

The configuration parameters comprise at least one of an offset value offset of CORESET0, parameter Kssb and a parameter of a start point of frequency domain resource offsetToPointA.

According to an embodiment, a user equipment (UE) in a wireless communication system is provided. The UE comprises a transceiver and at least one processor (or, controller) coupled to the transceiver and configured to perform the method described above.

According to an embodiment, a method performed by a base station is provided. The method comprises performing transmission of a signal and/or resource configuration information based at least one of a specified minimum channel bandwidth of a downlink frequency band, a synchronization signal/broadcast channel block SSB subcarrier spacing, a physical downlink control channel PDCCH subcarrier spacing, downlink frequency band information and a channel bandwidth.

The first signal for determining the channel bandwidth is transmitted from the base station to a terminal, and the resource configuration information is the configuration information transmitted in a second signal transmitted from the base station to the terminal.

The first signal is at least one of a Primary Synchronization Signal/Secondary Synchronization Signal PSS/SSS, a master information block (MIB) transmitted in a physical broadcast channel (PBCH), a payload other than the master information block (MIB) transmitted in the PBCH and a system information (SIB).

The second signal is at least one of a master information block (MIB) transmitted in the PBCH, a payload other than the master information block (MIB) transmitted in the PBCH and a system information (SIB).

The method further comprises determining a generation parameter of a PSS/SSS sequence according to the channel bandwidth.

The second signal is one or more of the following: a master information block transmitted in PBCH, a payload other than the master information block transmitted in the PBCH and SIB.

The method further comprises that the base station determining a generation parameter of a PSS/SSS sequence according to the channel bandwidth.

The base station determines at least one of parameter Kssb in a master information block transmitted in a physical broadcast channel (PBCH) and reserved bits in a payload other than the master information block transmitted in the PBCH according to a channel bandwidth, and transmits a downlink signal to a terminal according to the determined parameter.

When the frequency band is RMR-900 frequency band, n8, n26 or n28, the channel bandwidth is less than 5 MHz; and/or when the frequency band is on n79 or a newly defined frequency band nX, the channel bandwidth is one of 10 MHz and 20 MHz, wherein the newly defined frequency bands nX have overlap with n79.

The resource configuration information is a configuration parameters transmitted in a second signal transmitted from the base station to the terminal, and the method further comprises transmitting the second signal to the terminal according to the configuration parameters, and wherein the configuration parameters take PSS/SSS as a start point; and/or value ranges of the configuration parameters are extended value ranges.

The configuration parameters comprise one or more of the following: an offset value offset of CORESET0; parameter Kssb; and a parameter of a start point of frequency domain resource offsetToPointA.

There is provided a base station comprising: a transceiver; and at least one processor coupled to the transceiver and configured to perform the above methods.

According to an embodiment, a method performed by a user equipment (UE) in a wireless communication system is provided. The method comprises receiving, from a base station, a master information block (MIB) on a physical broadcast channel (PBCH), wherein the MIB includes information on at least one sub-carrier spacing (SCS), identifying a frequency band on which the MIB is received, in case that the frequency band is a first frequency band, determining configuration information for a CORESET based on a minimum channel bandwidth of the first frequency band and the at least one SCS, and in case that the frequency band is a second frequency band, determining the configuration information for the CORESET based on the at least one SCS.

A method performed by a user equipment (UE) in a wireless communication system is provided. The method comprises receiving, from a base station, a synchronization signal/physical broadcast channel (SS/PBCH) block on a PBCH, identifying a frequency band on which the SS/PBCH block is received, in case that the frequency band is a first frequency band, determining configuration information for a control resource set (CORESET) for a Type0 physical downlink control channel (PDCCH) search space set based on a minimum channel bandwidth of the first frequency band, and in case that the frequency band is a second frequency band including a n79 frequency band, determining the configuration information for the CORESET corresponding to the n79 frequency band.

The second frequency band includes n79.

The determining of the configuration information for the CORESET corresponding to the n79 frequency band comprises determining the configuration information for the CORESET based on a sub carrier spacing (SCS) for the SS/PBCH block and a SCS for a PDCCH.

A channel bandwidth of 10 MHz and a channel bandwidth of 20 MHz are supported by the second frequency band.

The method further comprises determining a channel bandwidth based on at least one parameter included in information transmitted on the PBCH, and receiving a physical downlink control channel (PDCCH) on the CORESET based on the determined channel bandwidth.

The at least one parameter is included in the MIB and/or SS/PBCH block transmitted on the PBCH.

The at least one parameter is at least one reserved bit included in payloads of the PBCH.

The method further comprises receiving, from the base station, a system information block 1 (SIB1) based on the PDCCH, and determining a channel bandwidth for receiving another SIB based on at least one parameter included in the SIB1.

The method further comprises receiving, from the base station, a primary synchronization signal (PSS) and a secondary synchronization signal (SSS), determining value ranges of parameters of the PSS and the SSS based on whether the UE supports a specific channel bandwidth in the second frequency band, wherein the parameters are for detecting sequences of the PSS and the SSS, calculating correlation of the PSS and the SSS with the parameters having the determined value ranges, and obtaining a cell number corresponding to the PSS and the SSS with the parameters having the determined value ranges.

According to a user equipment (UE) in a wireless communication system is provided. The UE comprises a transceiver and a controller coupled with the transceiver. The controller is configured to receive, from a base station, a master information block (MIB) on a physical broadcast channel (PBCH), wherein the MIB includes information on at least one sub-carrier spacing (SCS), identify a frequency band on which the MIB is received, in case that the frequency band is a first frequency band, determine configuration information for a CORESET based on a minimum channel bandwidth of the first frequency band and the at least one SCS, and in case that the frequency band is a second frequency band, determine the configuration information for the CORESET based on the at least one SCS.

A user equipment (UE) in a wireless communication system is provided. The UE comprises a transceiver and a controller coupled with the transceiver. The controller is configured to receive, from a base station, a synchronization signal/physical broadcast channel (SS/PBCH) block on a PBCH, identify a frequency band on which the SS/PBCH block is received, in case that the frequency band is a first frequency band, determine configuration information for a control resource set (CORESET) for a Type0 physical downlink control channel (PDCCH) search space set based on a minimum channel bandwidth of the first frequency band, and in case that the frequency band is a second frequency band including a n79 frequency band, determine the configuration information for the CORESET corresponding to the n79 frequency band.

The second frequency band includes n79.

The controller is further configured to determine the configuration information for the CORESET based on a sub carrier spacing (SCS) for the SS/PBCH block and a SCS for a PDCCH A channel bandwidth of 10 MHz and a channel bandwidth of 20 MHz are supported by the second frequency band.

The controller is further configured to determine a channel bandwidth based on at least one parameter included in information transmitted on the PBCH, and receive a physical downlink control channel (PDCCH) on the CORESET based on the determined channel bandwidth.

The at least one parameter is included in the MIB and/or SS/PBCH block transmitted on the PBCH.

The at least one parameter is at least one reserved bit included in payloads of the PBCH.

The controller is further configured to receive, from the base station, a system information block 1 (SIB1) based on the PDCCH, and determine a channel bandwidth for receiving another SIB based on at least one parameter included in the SIB1.

A method performed by a user equipment (UE) in a wireless communication system is provided. The method comprises receiving, from a base station via a frequency band, a synchronization signal/physical broadcast channel (SS/PBCH) block, in case that the frequency band corresponds to n79 new radio (NR) band supporting a minimum channel bandwidth of 10 MHz, determining configuration information for a control resource set (CORESET) for a Type0—physical downlink control channel (PDCCH) search space set using parameter sets identical to parameter sets for frequency bands with a minimum channel bandwidth of 40 MHz and in case that the frequency band does not correspond to the n79 NR band, determining configuration information for the CORESET for the Type0—PDCCH search space set using parameter sets determined based on a minimum channel bandwidth supported by the frequency band.

Figure 15:
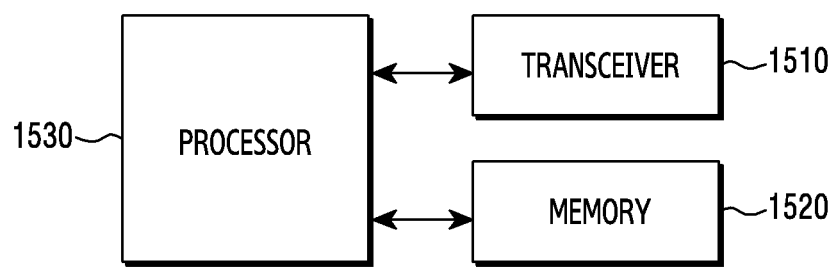
FIG. 15 illustrates an example of a structure of a UE according to an embodiment of the disclosure.

FIG. 15 illustrates an example of a structure of a UE according to an embodiment of the present disclosure.

As shown in FIG. 15, the UE according to an embodiment may include a transceiver 1510, a memory 1520, and a processor 1530. The transceiver 1510, the memory 1520, and the processor 1530 of the UE may operate according to a communication method of the UE described above. However, the components of the UE are not limited thereto. For example, the UE may include more or fewer components than those described above. In addition, the processor 1530, the transceiver 1510, and the memory 1520 may be implemented as a single chip. Also, the processor 1530 may include at least one processor. Furthermore, the UE of FIG. 15 corresponds to the UEs 111-116 of the FIG. 1, respectively.

The transceiver 1510 collectively refers to a UE receiver and a UE transmitter, and may transmit/receive a signal to/from a base station or a network entity. The signal transmitted or received to or from the base station or a network entity may include control information and data. The transceiver 1510 may include a RF transmitter for up-converting and amplifying a frequency of a transmitted signal, and a RF receiver for amplifying low-noise and down-converting a frequency of a received signal. However, this is only an example of the transceiver 1510 and components of the transceiver 1510 are not limited to the RF transmitter and the RF receiver.

Also, the transceiver 1510 may receive and output, to the processor 1530, a signal through a wireless channel, and transmit a signal output from the processor 1530 through the wireless channel.

The memory 1520 may store a program and data required for operations of the UE. Also, the memory 1520 may store control information or data included in a signal obtained by the UE. The memory 1520 may be a storage medium, such as read-only memory (ROM), random access memory (RAM), a hard disk, a CD-ROM, and a DVD, or a combination of storage media.

The processor 1530 may control a series of processes such that the UE operates as described above. For example, the transceiver 1510 may receive a data signal including a control signal transmitted by the base station or the network entity, and the processor 1530 may determine a result of receiving the control signal and the data signal transmitted by the base station or the network entity.

Figure 16:
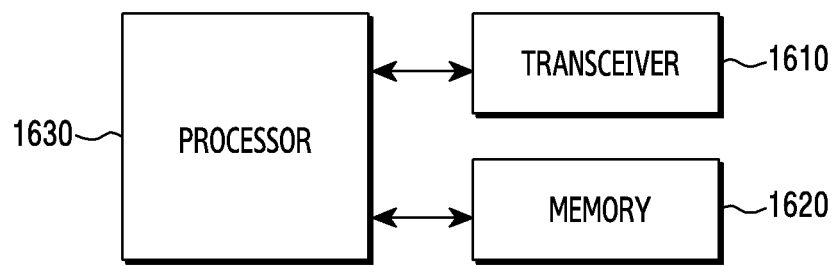
FIG. 16 illustrates an example of a structure of a base station according to an embodiment of the disclosure.

FIG. 16 illustrates an example of a structure of a base station according to an embodiment of the present disclosure.

As shown in FIG. 16, the base station according to an embodiment may include a transceiver 1610, a memory 1620, and a processor 1630. The transceiver 1610, the memory 1620, and the processor 1630 of the base station may operate according to a communication method of the base station described above. However, the components of the base station are not limited thereto. For example, the base station may include more or fewer components than those described above. In addition, the processor 1630, the transceiver 1610, and the memory 1620 may be implemented as a single chip. Also, the processor 1630 may include at least one processor. Furthermore, the base station of FIG. 16 corresponds to the gNBs 101 to 103 of the FIG. 1, respectively.

The transceiver 1610 collectively refers to a base station receiver and a base station transmitter, and may transmit/receive a signal to/from a terminal (UE) or a network entity. The signal transmitted or received to or from the terminal or a network entity may include control information and data. The transceiver 1610 may include a RF transmitter for up-converting and amplifying a frequency of a transmitted signal, and a RF receiver for amplifying low-noise and down-converting a frequency of a received signal. However, this is only an example of the transceiver 1610 and components of the transceiver 1610 are not limited to the RF transmitter and the RF receiver.

Also, the transceiver 1610 may receive and output, to the processor 1630, a signal through a wireless channel, and transmit a signal output from the processor 1630 through the wireless channel.

The memory 1620 may store a program and data required for operations of the base station. Also, the memory 1620 may store control information or data included in a signal obtained by the base station. The memory 1620 may be a storage medium, such as read-only memory (ROM), random access memory (RAM), a hard disk, a CD-ROM, and a DVD, or a combination of storage media.

The processor 1630 may control a series of processes such that the base station operates as described above. For example, the transceiver 1610 may receive a data signal including a control signal transmitted by the terminal, and the processor 1630 may determine a result of receiving the control signal and the data signal transmitted by the terminal.

Although the present disclosure has been described with various embodiments, various changes and modifications may be suggested to one skilled in the art. It is intended that the present disclosure encompass such changes and modifications as fall within the scope of the appended claims.

What is claimed:

1. A method performed by a user equipment (UE), the method comprising:
   receiving, from a base station, a synchronization signal (SS)/physical broadcast channel (PBCH) block including a primary synchronization signal (PSS), a secondary synchronization signal (SSS), and a master information block (MIB), wherein the MIB includes information on a control resource set (CORESET) for a Type0-physical downlink control channel (PDCCH) search space set;
   identifying whether the SS/PBCH block is received in a first frequency band or a second frequency band;
   in response to the SS/PBCH block being received in the first frequency band:
      determining a first table among a first table set for the first frequency band based on a combination of a subcarrier spacing (SCS) of the SS/PBCH block and an SCS of a Type0-PDCCH for the first frequency band, and a minimum channel bandwidth of the first frequency band; and
      determining a number of first resource blocks and a number of first slot symbols of the CORESET from the first table including a set of resource blocks and slot symbols of the CORESET, based on the information on the CORESET;
   in response to the SS/PBCH block being received in the second frequency band:
      determining a second table among a second table set associated with a minimum channel bandwidth of 40 MHz based on a combination of the SCS of the SS/PBCH block and an SCS of a Type0-PDCCH for the second frequency band; and
      determining the number of the first resource blocks and the number of the first slot symbols of the CORESET from the second table including a set of resource blocks and slot symbols of the CORESET, based on the information on the CORESET.

2. The method of claim 1, wherein the second frequency band includes n79.

3. The method of claim 1, wherein a channel bandwidth of 10 MHz and a channel bandwidth of 40 MHz are configured for the second frequency band.

4. The method of claim 3, wherein the channel bandwidth of 10 MHz corresponds to a minimum channel bandwidth of the second frequency band.

5. The method of claim 1, further comprising:
   determining a channel bandwidth based on at least one parameter included in the SS/PBCH block, and
   receiving, based on the channel bandwidth, a PDCCH on the CORESET.

6. The method of claim 5, wherein the at least one parameter is at least one reserved bit included in payloads of the SS/PBCH block.

7. The method of claim 5, further comprising:
   receiving, from the base station, a system information block 1 (SIB1) based on the PDCCH, and
   determining a channel bandwidth for receiving another SIB based on at least one parameter included in the SIB1.

8. The method of claim 1, further comprising:
   determining value ranges of parameters of the PSS and the SSS based on whether the UE supports a specific channel bandwidth in the second frequency band, wherein the parameters are used for detecting sequences of the PSS and the SSS;
   calculating a correlation of the PSS and the SSS with the parameters having the value ranges; and
   obtaining a cell number corresponding to the PSS and the SSS with the parameters having the value ranges.

9. A user equipment (UE) comprising:
   at least one transceiver;
   at least one processor communicatively coupled to the at least one transceiver; and
   at least one memory, communicatively coupled to the at least one processor, storing instructions executable by the at least one processor individually or in any combination to cause the UE to:
      receive, from a base station, a synchronization signal (SS)/physical broadcast channel (PBCH) block including a primary synchronization signal (PSS), a secondary synchronization signal (SSS), and a master information block (MIB), wherein the MIB includes information on a control resource set (CORESET) for a Type0-physical downlink control channel (PDCCH) search space set,
      identify whether the SS/PBCH block is received in a first frequency band or a second frequency band,
      in case that the SS/PBCH block is received in the first frequency band:
         determine a first table among a first table set for the first frequency band based on a combination of a subcarrier spacing (SCS) of the SS/PBCH block and an SCS of a Type0-PDCCH for the first frequency band, and a minimum channel bandwidth of the first frequency band,
         determine a number of first resource blocks and a number of first slot symbols of the CORESET from the first table including a set of resource blocks and slot symbols of the CORESET, based on the information on the CORESET,
      in case that the SS/PBCH block is received in the second frequency band:
         determine a second table among a second table set associated with a minimum channel bandwidth of 40 MHz based on a combination of the SCS of the SS/PBCH block and an SCS of a Type0-PDCCH for the second frequency band, and
         determine the number of the first resource blocks and the number of the first slot symbols of the CORESET from the second table including a set of resource blocks and slot symbols of the CORESET, based on the information on the CORESET.

10. The UE of claim 9, wherein the second frequency band includes n79.

11. The UE of claim 9, wherein a channel bandwidth of 10 MHz and a channel bandwidth of 40 MHz are configured for the second frequency band.

12. The UE of claim 11, wherein the channel bandwidth of 10 MHz corresponds to a minimum channel bandwidth of the second frequency band.

13. The UE of claim 9, wherein the instructions further cause the UE to:
   determine a channel bandwidth based on at least one parameter included in the SS/PBCH block, and
   receive, based on the channel bandwidth, a PDCCH on the CORESET.

14. The UE of claim 13, wherein the at least one parameter is at least one reserved bit included in payloads of the SS/PBCH block.

* * * * *